(12) United States Patent
Shende et al.

(10) Patent No.: US 12,188,597 B2
(45) Date of Patent: Jan. 7, 2025

(54) QUICK RELEASE COUPLING

(71) Applicant: Danfoss Power Solutions II Technology A/S, Nordborg (DK)

(72) Inventors: Amit Ramesh Shende, Pune (IN); Sébastien Lafond, Habere Lullin (FR); Joffrey Boutherin, Mont Saxonnex (FR)

(73) Assignee: DANFOSS POWER SOLUTIONS II TECHNOLOGY A/S, Nordborg (DK)

( * ) Notice: Subject to any disclaimer, the term of this patent is extended or adjusted under 35 U.S.C. 154(b) by 153 days.

(21) Appl. No.: 17/997,302

(22) PCT Filed: Apr. 28, 2021

(86) PCT No.: PCT/EP2021/025160
§ 371 (c)(1),
(2) Date: Oct. 27, 2022

(87) PCT Pub. No.: WO2021/219251
PCT Pub. Date: Nov. 4, 2021

(65) Prior Publication Data
US 2023/0167932 A1    Jun. 1, 2023

(30) Foreign Application Priority Data
Apr. 30, 2020 (IN) .............................. 202011018486

(51) Int. Cl.
*F16L 37/23* (2006.01)
*F16L 37/62* (2006.01)

(52) U.S. Cl.
CPC .............. *F16L 37/23* (2013.01); *F16L 37/62* (2013.01); *Y10T 137/87925* (2015.04); *Y10T 137/87973* (2015.04)

(58) Field of Classification Search
CPC . F16L 37/23; F16L 37/62; F16L 37/32; Y10T 137/87973; Y10T 137/87925
See application file for complete search history.

(56) References Cited

U.S. PATENT DOCUMENTS 3,348,575 A * 10/1967 Simak ..................... F16L 37/23
285/306
4,150,691 A * 4/1979 Maldavs .................. B60D 1/64
137/614.03

(Continued)

FOREIGN PATENT DOCUMENTS

| CN | 1168171 A | 12/1997 |
|---|---|---|
| CN | 101952627 A | 1/2011 |

(Continued)

OTHER PUBLICATIONS

International Search Report mailed on Aug. 16, 2021, in connection with corresponding International Application No. PCT/EP2021/025160; 6 pages.

*Primary Examiner* — Atif H Chaudry
(74) *Attorney, Agent, or Firm* — McCormick, Paulding & Huber PLLC

(57) ABSTRACT

An improved quick release coupling is provided. The quick release coupling enables higher fluid flow rates and lower pressure drops. The quick release coupling is configured to be a connection and disconnection under high pressure conditions on one or both of the male and the female sides of the coupling. The quick release coupling enables intentional manual disconnection as well as breakaway disconnection under high working pressures.

16 Claims, 26 Drawing Sheets

(56) References Cited

U.S. PATENT DOCUMENTS

| | | | | |
|---|---|---|---|---|
| 4,598,896 | A | * | 7/1986 | Maldavs ................. F16L 37/23 137/454.2 |
| 4,664,148 | A | | 5/1987 | Magnuson |
| 2007/0001143 | A1 | | 1/2007 | Konishi et al. |
| 2017/0184242 | A1 | | 6/2017 | Faverges |
| 2017/0343128 | A1 | * | 11/2017 | Chiu ....................... F16L 37/23 |
| 2018/0142824 | A1 | * | 5/2018 | Gennasio ................ F16L 37/36 |

FOREIGN PATENT DOCUMENTS

| | | |
|---|---|---|
| CN | 102032374 A | 4/2011 |
| EP | 1077340 A2 | 2/2001 |
| EP | 3292341 | 3/2018 |

* cited by examiner

QUICK RELEASE COUPLING

CROSS-REFERENCE TO RELATED APPLICATIONS

This application is a National Stage application of International Patent Application No. PCT/EP2021/025160, filed on Apr. 28, 2021, which claims priority to Indian Patent Application No. 202011018486, filed on Apr. 30, 2020, each of which is hereby incorporated by reference in its entirety.

BACKGROUND

Quick release couplings are used in a variety of applications. Commonly, quick release couplings are used to facilitate the connection and disconnection of air hoses and hydraulic lines. For example, heavy machinery (e.g., tractors, loaders, etc.) may include one or more hydraulic motors that are configured to pressurize hydraulic fluid to drive a number of different hydraulic powered attachments (e.g., backhoes, buckets, plows, etc.). Quick release coupling enables the hydraulic lines that connect the attachment to the tractor to be connected and disconnected quickly and easily in the field.

SUMMARY

The present disclosure provides an improved quick release coupling. The quick release coupling of the present disclosure provides valuable efficiencies. The quick release coupling of the present disclosure enables higher fluid flow rates and lower pressure drops. The quick release coupling of the present disclosure is configured to be a connection and disconnection under high pressure conditions on one or both of the male and the female sides of the coupling. The quick release coupling of the present disclosure enables intentional manual disconnection as well as breakaway disconnection under high working pressures.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following Detailed Description Embodiments of the present disclosure will hereinafter be described in conjunction with the appended drawings, wherein like numerals denote like elements.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Figure 1:
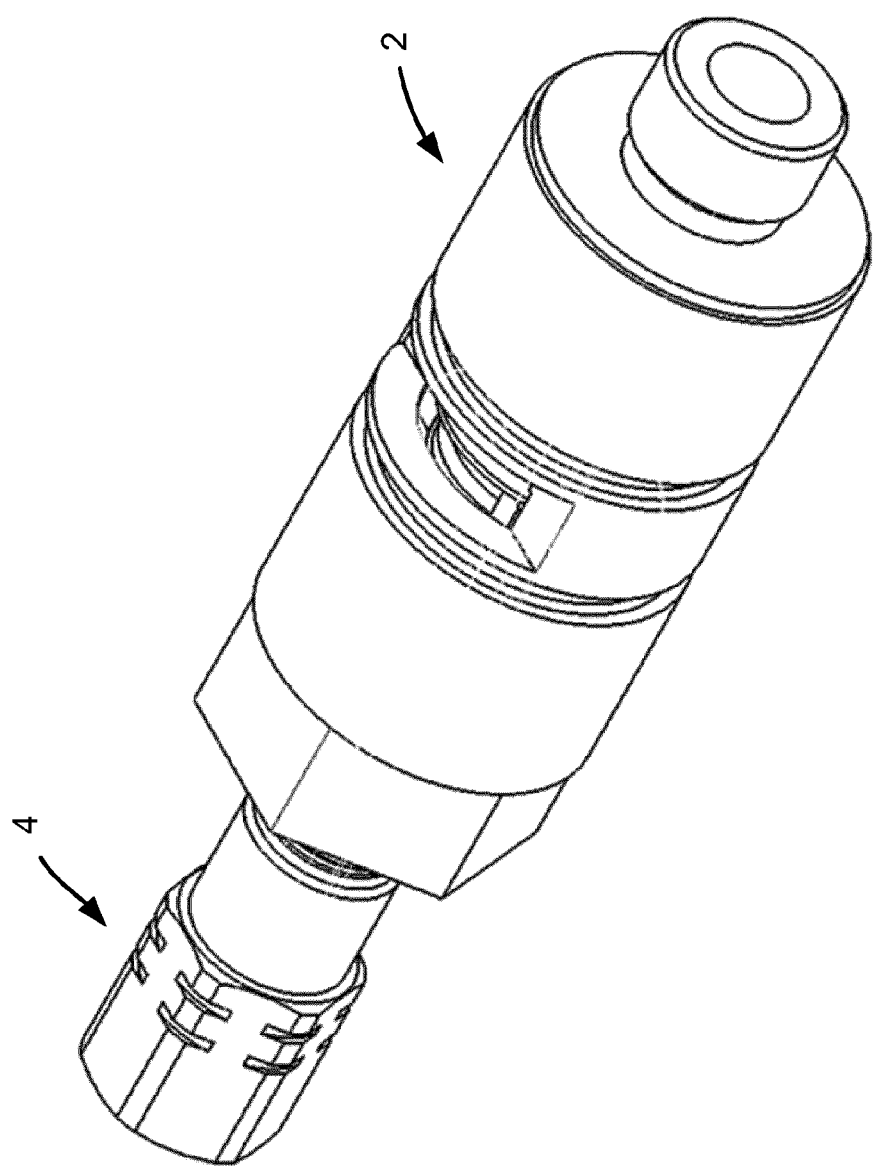
FIG. 1 is an isometric view of an embodiment of the coupling of the present disclosure.

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

An embodiment of the present disclosure will be described herein in further detail with reference to the figures. In the depicted embodiment, the coupling assembly includes a female coupling assembly 2 and a male coupling assembly 4, which are configured to be easily and quickly connected to, and disconnected from, each other. The male coupling assembly 4 includes a plug body 6 and a plug 8. The plug assembly in the depicted embodiment is an industry standard plug assembly (e.g., an ISO A plug). The coupling assembly 2, 4 is configured to mate with industry standard plugs yet provide many improvements over prior art coupling systems. Although the coupling assembly is compatible with standard plug assemblies, the coupling assembly of the present disclosure is new.

An embodiment of the coupling assembly of the present disclosure is described in further detail below. In the depicted embodiment, the coupling assembly 2, 4 includes a coupler body 10, a socket assembly 12, a piston assembly 14, a poppet assembly 16, and a forward locking assembly 114.

In the depicted embodiment, the coupler body 10 has a generally cylindrical shape including a second end portion 18 and an opposed first end portion 20. A through aperture extends through the coupler body 10. In the depicted embodiment, the outer surface of the coupler body 10 is defined by a constant diameter DO. In the depicted embodiment, the inner surface of the coupler body 10 is defined by a number of different adjacent surfaces having different diameters. The inner surface of the coupler body 10 includes a first section 22 defined by a diameter D1, a second section 24 defined by a diameter D2, a third section 26 defined by a diameter D3, a fourth section 28 defined by a diameter D4, a fifth section 30 defined by a diameter DS, a six section 32 defined by a diameter D6, a seventh section 34 defined by a diameter D7, and an eighth section 36 defined by a diameter D8.

In the depicted embodiment, the socket assembly 12 is coaxially positioned within the coupler body 10 and configured to slide laterally within the coupler body 10 in a first direction FD and a second direction SD.

In the depicted embodiment, the socket assembly 12 includes a socket body 38 that is located in the first end portion 20 of the coupler body 10 and extends toward the second end portion 18. In the depicted embodiment, the socket body 38 has a central annular opening 40 and includes a stepped outer profile and a stepped inner profile. The outer profile includes a number of adjacent sections having surfaces that are defined by a number of different diameters. In the depicted embodiment, the first section 42 of the socket body 38 is located at the second end of the socket body 38 and is defined by a diameter D9, the second section 44 of the socket body 38 is defined by a diameter D10, and the third section 46 of the socket body 38 is defined by a diameter D11.

In the depicted embodiment, D11 is greater than D9, and D9 is greater than D10. In the depicted embodiment, D4 is slightly larger than D9 and a seal is created between the surfaces by a pair of o-rings 48, 50 that are recessed into the first section 42 of the socket body 38. In the depicted embodiment, D5 and D6 are substantially larger than D10 thereby creating an annular socket cavity 52 located between the socket body 38 and the coupler body 10. The socket cavity 52 is coaxial with the second section 44 of the socket body 38. In the depicted embodiment, D11 is slightly smaller than D6 and a seal is created between the surfaces with a seal 54 that is recessed into the second section 44 of the socket body 38. In the depicted embodiment, D7 is variable and defines a tapered surface.

In the depicted embodiment, the stepped inner profile of the socket body 38 includes a first section 56 on the inside of the socket body 38 and is defined by a diameter D12, a second section 58 on the inside of the socket body 38 is defined by a diameter D13, a third section 60 on the inside of the socket body 38 is defined by a diameter D14, and a fifth section 62 on the inside of the socket body 38 is defined by a diameter D15.

In the depicted embodiment, the second section 44 of the socket body 38 supports a double acting socket body spring 64. The socket body spring 64 compresses when the socket body 38 moves in either the first direction FD or the second direction SD, from its normal position. The socket body spring 64 biases the socket body 38 back to the at rest position within the coupler body 10. In the depicted embodiment the socket body spring 64 is prevented from moving in the second direction by a retaining ring 214.

In the depicted embodiment, the piston assembly 14 includes a piston 84 including a second portion 66 that is positioned within the socket body 38 and a first portion 68 that is outside of the socket body 38. In the depicted embodiment, the first portion 66 of the piston 84 includes a first cylindrical surface 70 that is defined by a diameter D16 and a second cylindrical surface 72 that is defined by a diameter D17. In the depicted embodiment, the second portion 68 of the piston 84 includes a first cylindrical surface 74 that is defined by a diameter D18, a second cylindrical surface 76 defined by a diameter D19, a third cylindrical surface 78 defined by a diameter D20, fourth cylindrical surface 80 defined by a diameter D21, and a fifth cylindrical surface 82 defined by a diameter D22. In the depicted embodiment, diameter D18 is variable and defines a tapered cylindrical surface.

In the depicted embodiment, the second section 44 of the socket body 38 seals against the first cylindrical surface 70 of the piston 84 via a pair of seals 86, 88 that are partially recessed into the second section 44 of the socket body 38. In the depicted embodiment seal 204 seals the interface between the piston 84 and the coupling body 10.

In the depicted embodiment, the piston assembly 14 includes a piston spring 90 that biases the piston 84 in the second direction SD. A shoulder 92 located between the third cylindrical surface 78 and the fourth cylindrical surface 80 is configured to butt up against a snap ring 94 that is partially recessed into the eighth section 36 of the coupler body 10.

In the depicted embodiment, the poppet assembly 16 includes a poppet guide 100, a poppet 102, a poppet pin 104, a pin spring 106, and a retaining ring 108. In the depicted embodiment, the poppet guide 100 is received in the second end portion 68 of the piston 84. The poppet guide 100 has a cylindrical outer surface that seals against the inner surface of the second end portion 68 of the piston 84 via a pair of seals 110, 112. The poppet guide 100 is retained within the second end portion 68 of the piston 84 with a retaining ring 108.

In the depicted embodiment, the poppet 102 includes a second end, a first end, and a central aperture. In the depicted embodiment, the second end of the poppet 102 is slideably received in the poppet guide 100. In the depicted embodiment, a seal 120 seals the outer cylindrical surface of the second end of the poppet 102 against the inner cylindrical surface of the poppet guide 100.

In the depicted embodiment, the second end 116 of the poppet 102 includes a diamond shaped cross-section with a seal 122 recessed therein that is configured to seal against an angled inner surface 124 of the piston 84.

In the depicted embodiment, the poppet pin 104 is received within the central aperture of the poppet 102. In the depicted embodiment, a pair of seals 210, 212 interface between the external surface of the poppet pin 104 and the internal surface of the poppet 102 and creates a seal between the components and enables the opening and closing of flow paths during, which are described in detail below. The poppet pin 104 includes a first end portion, a second end portion, and a mid-portion there between. In the depicted embodiment, a pin spring 106 is positioned between the second end portion of the poppet pin 104 and the poppet guide 100. The pin spring 106 biases the poppet pin 104 in the second direction SD.

In the depicted embodiment, the coupling assembly 2, 4 includes a plug-to-socket auto-locking assembly that locks the plug body 6 to the socket body 38. The plug-to-socket auto-locking assembly operates when the locking balls 116 that selectively engaged with the socket body 38 and the coupling body 10 move into and out of engagement with an annular groove in the plug body 6.

In the depicted embodiment, the coupling assembly 2, 4 includes a forward locking assembly 114. The decoupling locking assembly 114 includes a ball support 126, a ball support spring 138, and at least one ball 130 (e.g., two balls, three balls, etc.). In the depicted embodiment, the decoupling locking assembly 114 prevents the socket from moving in the second direction SD thereby retaining the plug-to-socket auto-locking assembly in an engaged locked orientation. The decoupling locking assembly 114 can be disengaged manually during a decoupling sequence or disengaged automatically during a breakaway sequence to allow the plug-to-socket auto-locking assembly to disengage. The ball support 126 is slideably supported on the exterior surface of the piston 84. The socket body 38 can move without moving the ball support 126. However, movement of the socket body 38 in the first direction FD can also drive the ball support 126 in the first direction FD. The piston 84 can move without moving the ball support 126. However, movement of the piston 84 in the second direction SD can also drive the ball support 126 in the second direction SD.

In the depicted embodiment, there exists a number of fluid flow paths within the coupling. A primary flow path extends through the center portion of the coupling when the female coupling assembly 2 is connected to the male coupling assembly 4. The primary flow path is large with few constrictions. The flow path results in a minimal pressure drop and a high flow rate.

Figure 26:
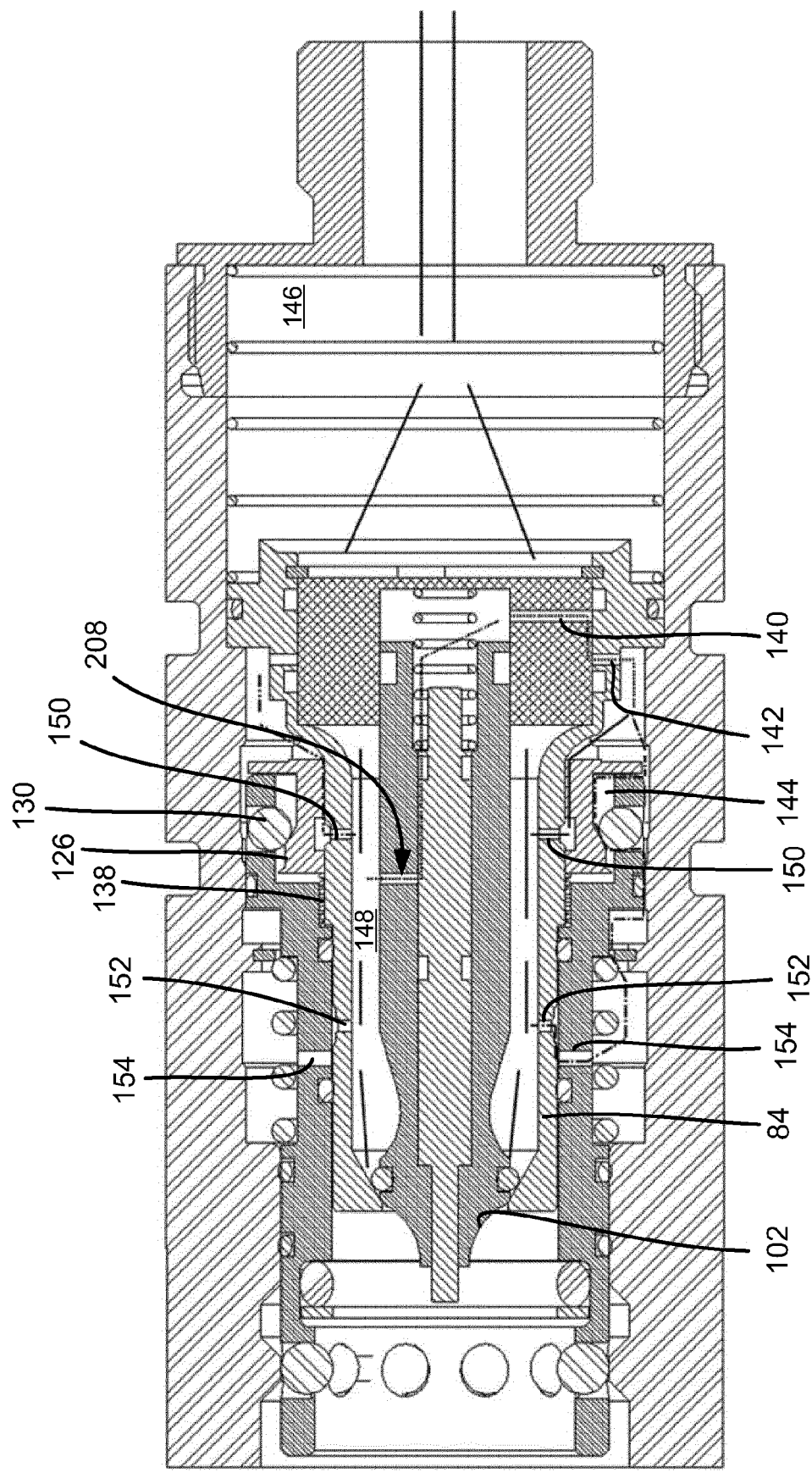
FIG. 26 is a cross-sectional plane view of the coupling of FIG. 1.

Referring to FIG. 26, another cross-section of the coupling of FIG. 1 is shown. This cross-section is cut at a slightly different angle than the other cross-sections and illustrates internal components that are not evident in the other cross-sections.

Referring to FIG. 26, in the depicted embodiment an internal flow path FP1 is defined by hydraulic fluid in the coupling body cavity 146 flowing into the piston cavity 148, from the piston cavity 148 through a flow path 208 in the poppet 102 into an annular space between the poppet 102 and the poppet pin 104, from the annular space between the poppet 102 and the poppet pin 104 through a flow path 140 in the poppet guide 100, from the flow path 140 in the poppet guide 100 into the annular space between the poppet guide 100 and the inner surface of the piston 84, from the annular space between the poppet guide 100 and the inner surface of the piston 84 through the flow path 142 through the piston wall, from the flow path 142 in the piston wall into the ball support cavity 144, and from the ball support cavity 144 out of the coupling body 10 to an external tank reservoir.

In the depicted embodiment, an internal flow path FP2 is defined by hydraulic fluid in the coupling body cavity 146 flowing into the piston cavity 148, from the piston cavity 148 into a flow path 150 in the piston 84, from the flow path 150 in the piston 84 into the annular space between the piston 84 and the ball support 126, from the annular space between the piston 84 and the ball support 126 into the ball support cavity 144, and from the ball support cavity 144 out of the coupling body 10 into an external tank reservoir.

In the depicted embodiment, an internal flow path FP3 is defined by hydraulic fluid in the coupling body cavity 146 flowing into the piston cavity 148, from the piston cavity 148 into a flow path 152 in the piston 84, from the flow path 152 in the piston 84 into the annular space between the piston 84 and the socket body 38, from the annular space between the piston 84 and the socket body 38 through the flow path 154 in the socket body 38, from the flow path 154 in the socket body 38 into the socket cavity 52, from the socket cavity 52 into the annular space between the socket body 38 and the inner surface of the coupling body 10, from the annular space between the socket body 38 and the inner surface of the coupling body 10 into the ball support cavity 144, and from the ball support cavity 144 out of the coupling body 10 to an external tank reservoir.

In the depicted embodiment, the internal components are sized and shaped to generate particular relative forces when the coupling is under pressure. In the depicted embodiment, the inner cylinder aperture of the piston 84 is a projected circular area A1. Area is equal to pie times the radius squared. The radius that corresponds to the area A1 is half of the diameter of the inside of the socket body D13, which is just slightly larger than half of the diameter of the piston D16. This area A1 is also essentially equal to the projected area of the end of the plug body 6 and plug 8 combination.

In the depicted embodiment, the socket body 38 includes a radially extending wall portion 200 that encloses an end of the socket cavity 202. The projected area of the radially extending wall portion 200 defines an annular area A2. The annular area A2 is equal to pie times the radius squared, where the radius is half of the diameter D15 minus pie times the radius squared, where the radius is half of the diameter D10. In the depicted embodiment, A1 is substantially equal to 2. When the coupling is pressurized, the magnitude of the force F1 that pushes against the face of the plug body 6 and plug 8 in a second direction SD is proportional to area A1. Simultaneously, the magnitude force F2 that pushes the shoulder 200 in a first direction FD is proportional to area A2. Since the areas A1 and A2 are substantially equivalent, the forces F1 and F2 are balanced.

In the depicted embodiment, the annular projected area A3 of the second end portion 68 of the piston 84 is acted on by hydraulic pressure to push the piston 84 in the second direction SD. The area A3 is equal to pie times the radius squared, where the radius is half of the diameter D20 minus pie times the radius squared, where the radius is half of the diameter D16. In the depicted embodiment, the projected area A4 of the back side of the head of the poppet 102 and the back side of the head of the plug 8 is substantially equal. The area A4 is equal to pie times the radius squared, where the radius is half of the diameter D25. In the depicted embodiment, the area A3 is substantially larger than the area A4. Hence, when the female coupling assembly 2 is pressurized, it has the force to open the plug 8 even if there is substantially higher pressure behind the plug 8.

Figure 2:
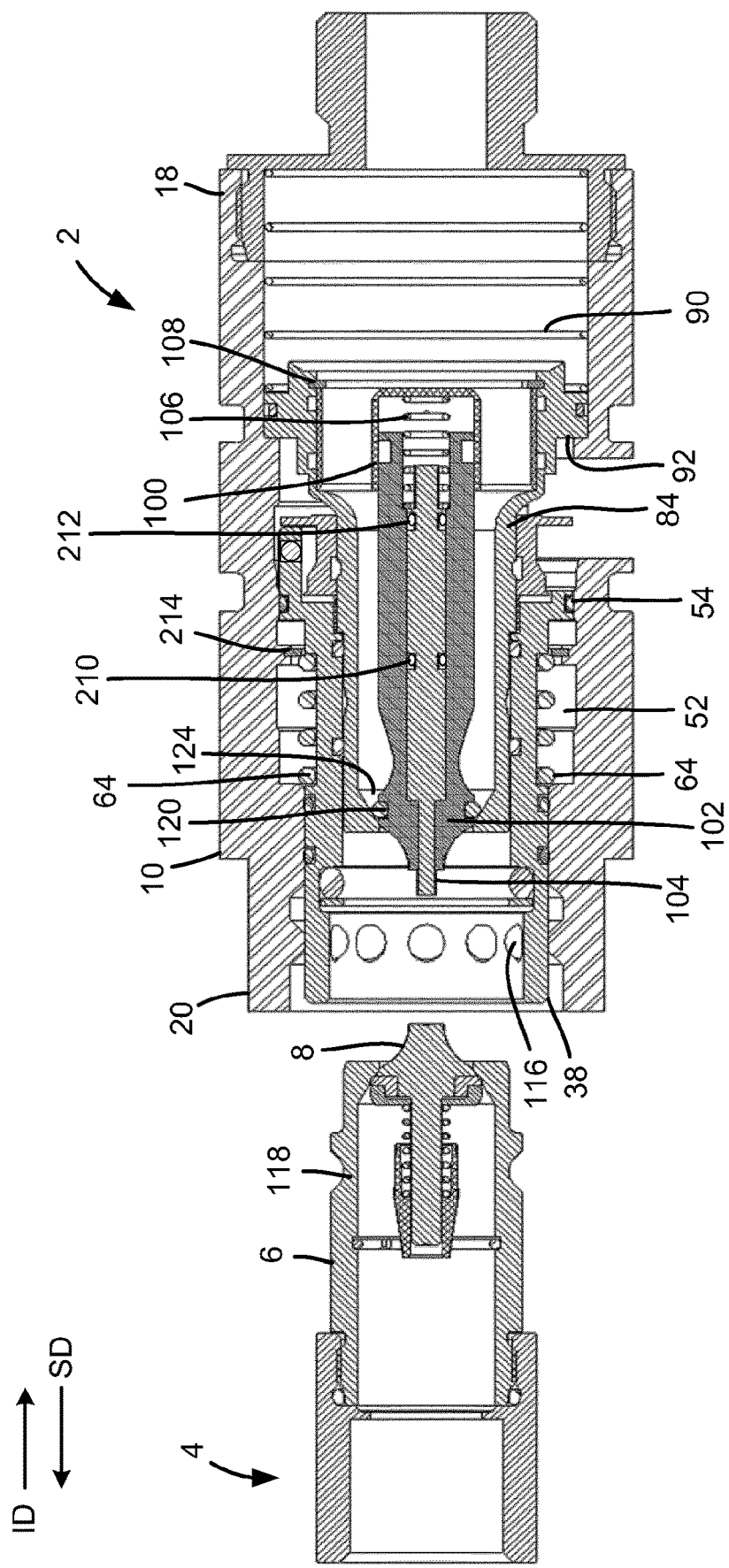
FIG. 2 is a cross-sectional plane view of the coupling of FIG. 1 in a first state.
Figure 3:
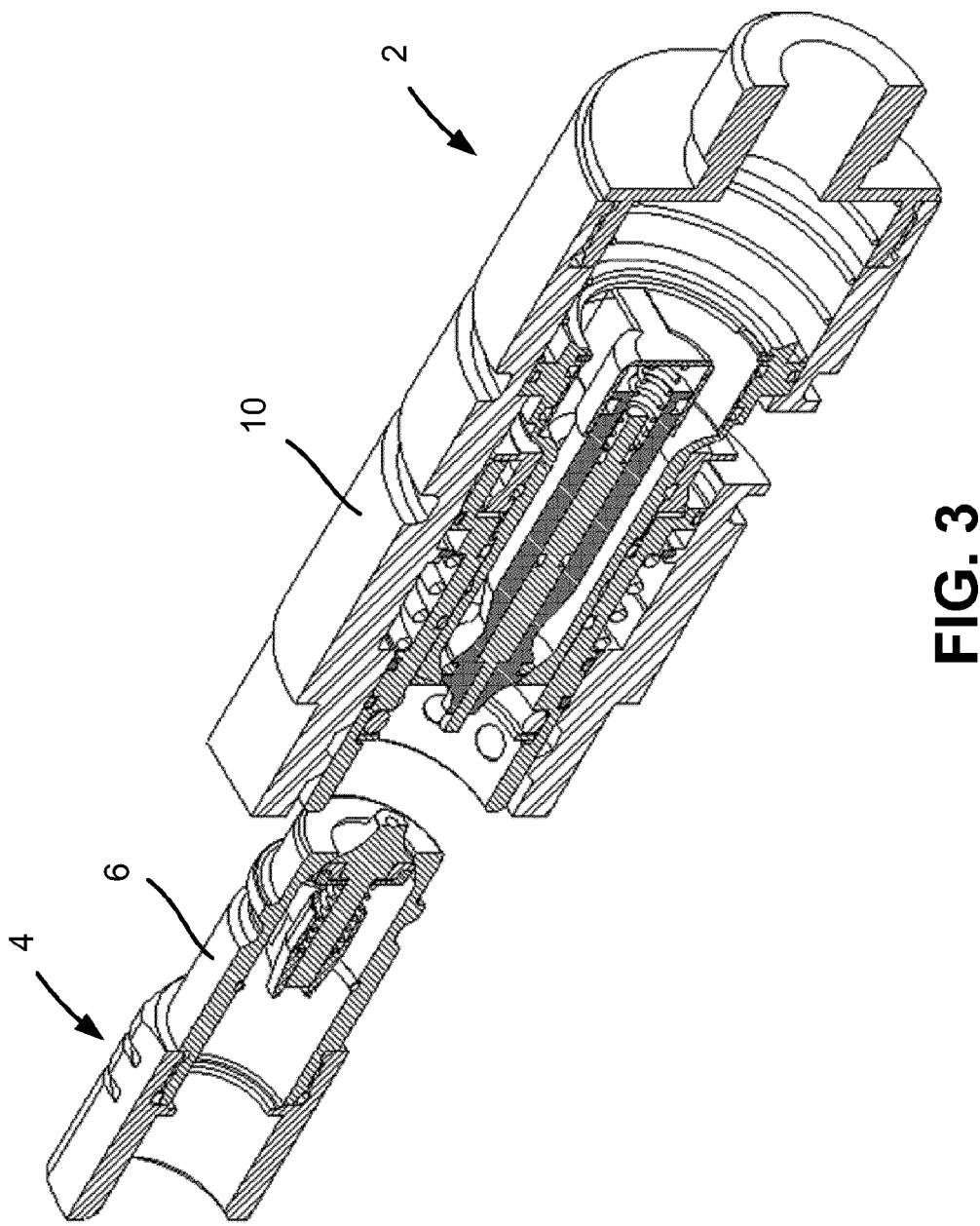
FIG. 3 is a cross-sectional isometric view of the coupling of FIG. 1 in a first state.

Referring to FIGS. 2 and 3, a first state is illustrated. In the depicted first state, the female coupling assembly 2 and the male coupling assembly 4 are completely disconnected from each other. The depicted first state represents a pre-connection sequence state. In the depicted first state, a hydraulic pump/motor that is configured to drive hydraulic fluid from the male coupling assembly 4 to the female coupling assembly 2 is shut off. In the depicted first state, either or both of the male and the female coupling assemblies 4, 2 may be under residual pressure. Even if the motor/pump is shut off, there can be relatively high residual pressure in the female coupling assembly 2 (e.g., 200 bar, which can be the operating pressure in the system). Even if the attachment that is connected to the male coupling assembly 4 is not powered, it should be appreciated that very high residual pressure may exist in the male coupling assembly 4 (e.g., 400 bars because the attachment could be statically supporting a physical load).

Figure 4:
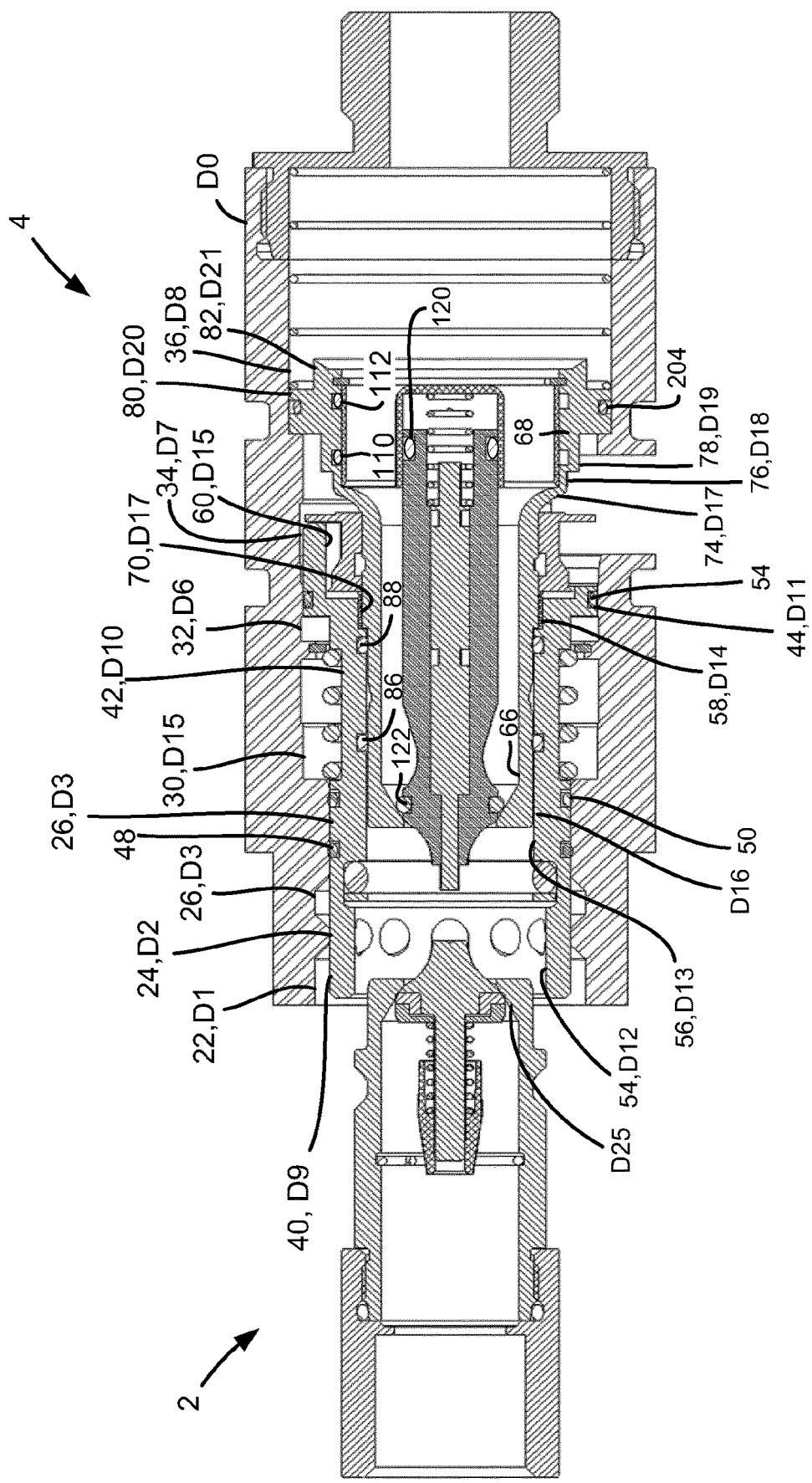
FIG. 4 is a cross-sectional plane view of the coupling of FIG. 1 in a second state.
Figure 5:
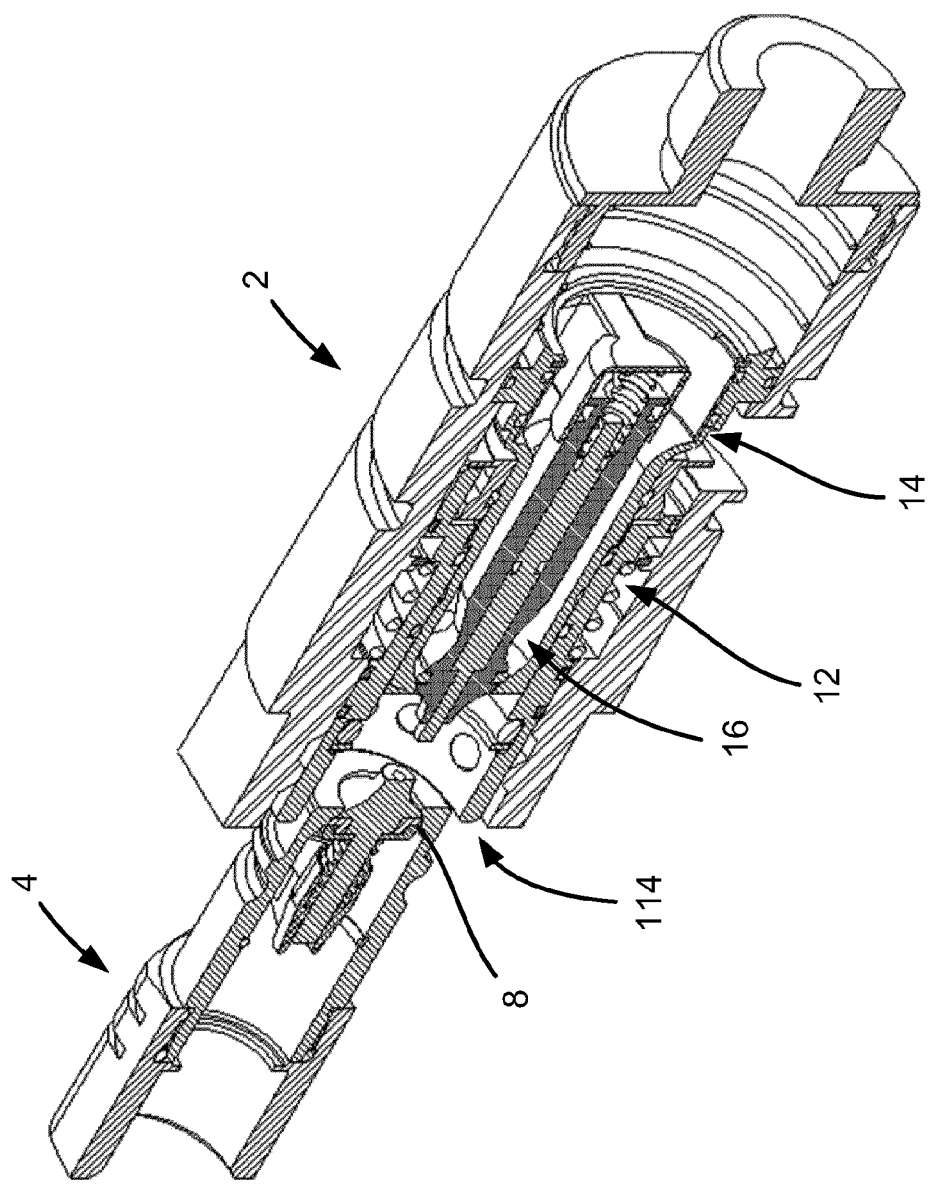
FIG. 5 is a cross-sectional isometric view of the coupling of FIG. 1 in a second state.

Referring to FIGS. 4 and 5, a second state is illustrated. The depicted second state illustrates the initiation of the connection sequence. In the depicted second state, the operator has manually coaxially aligned the male coupling assembly 4 with the female coupling assembly 2. The operator manually pushes the male coupling assembly 4 towards the female coupling assembly 2.

Figure 6:
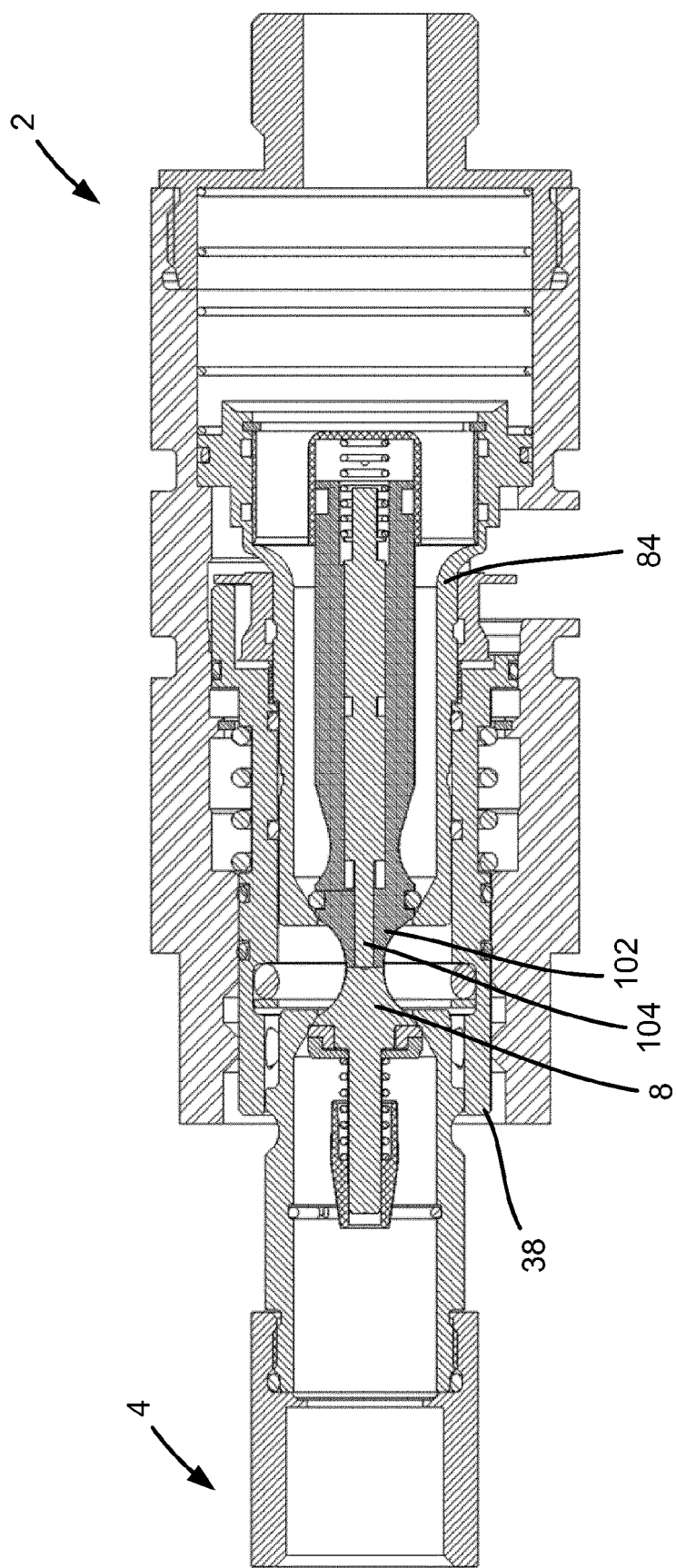
FIG. 6 is a cross-sectional plane view of the coupling of FIG. 1 in a third state.
Figure 7:
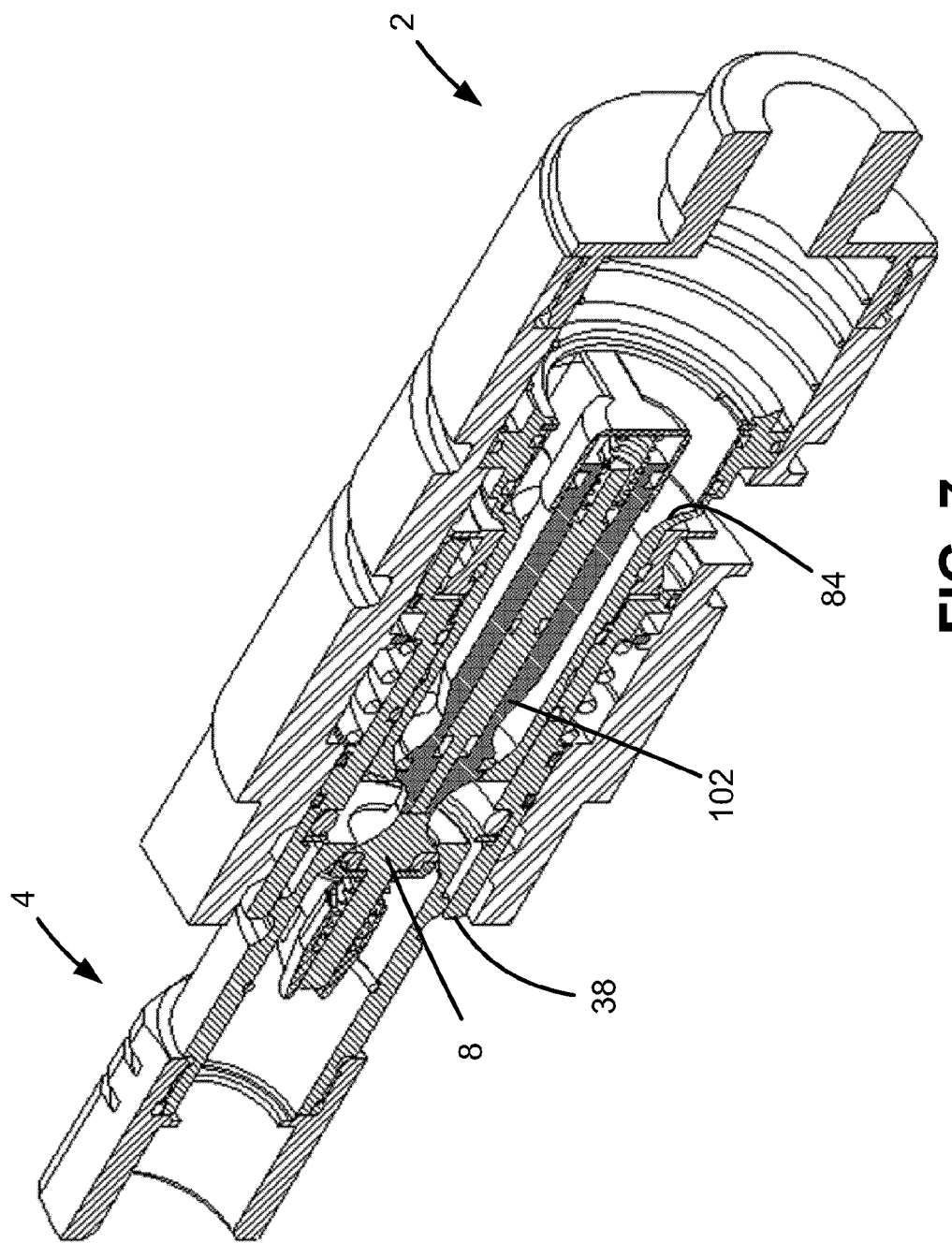
FIG. 7 is a cross-sectional isometric view of the coupling of FIG. 1 in a third state.

Referring to FIGS. 6 and 7, a third state is illustrated. In the depicted third state, the male coupling assembly 4 has been further pushed into the female coupling assembly 2. The plug 8 of the male coupling assembly 4 has been pushed into contact with the poppet pin 104 and has driven it rearward. In the depicted third state, the front of the poppet pin 104 is flush with the front of the poppet 102. The rearward displacement (displacement of the poppet pin 104 in the first direction FD) of the poppet pin 104 has partially compressed the pin spring 106. In the depicted third state, the poppet 102, the piston 84, the socket body 38, and the ball support 126 remain stationary in the home position. Since the poppet 102 has not moved relative to the piston 84, the front end of the poppet 102 remains sealed against the piston 84.

In the depicted third state, flow path FP1 is open, flow path FP2 is closed, flow path FP3 is closed, and the primary flow path is closed. In the third state, the pressure in the coupling body 146 would be relieved, and hence low, since flow path FP1 is open to the tank in the hydraulic circuit. For example, the pressure in the coupling body 146 may have dropped from 200 bars to 5-10 bars. Because the pump is shut off, the pressure in the coupling body 146 remains low. Flow path FP2 is closed because the flow is blocked at the annular space between the piston 84 and the ball support 126. The ball support 126 would need to move relative to the piston 84 for flow path FP2 to open. In this state, flow path FP3 is closed because the flow is blocked at the annular space between the socket body 38 and the inner surface of the coupling body 146 by a seal 86 recessed in the external surface of the socket body 38 that is sealed against the inner surface of the coupling body 146. For the flow path FP3 to be open, the socket body 38 would need to move.

Figure 8:
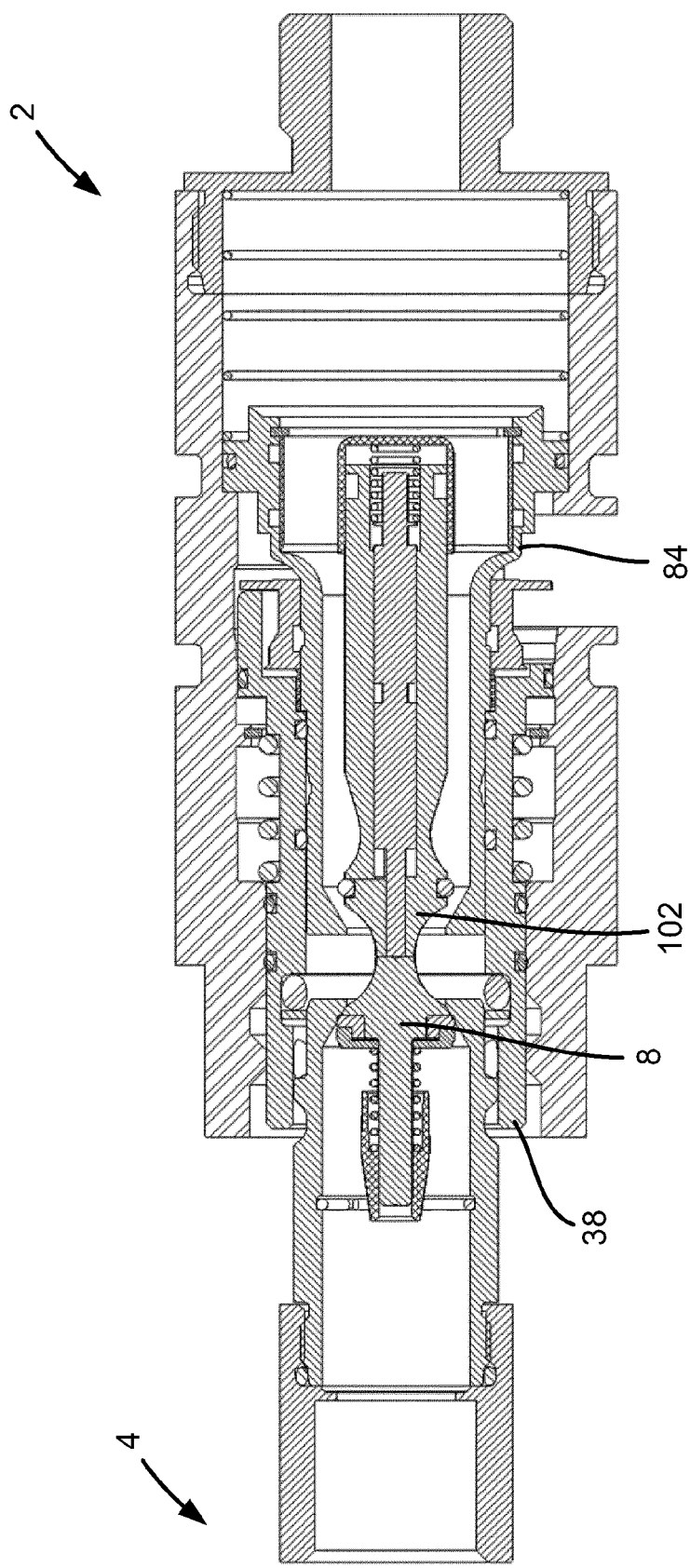
FIG. 8 is a cross-sectional plane view of the coupling of FIG. 1 in a fourth state.
Figure 9:
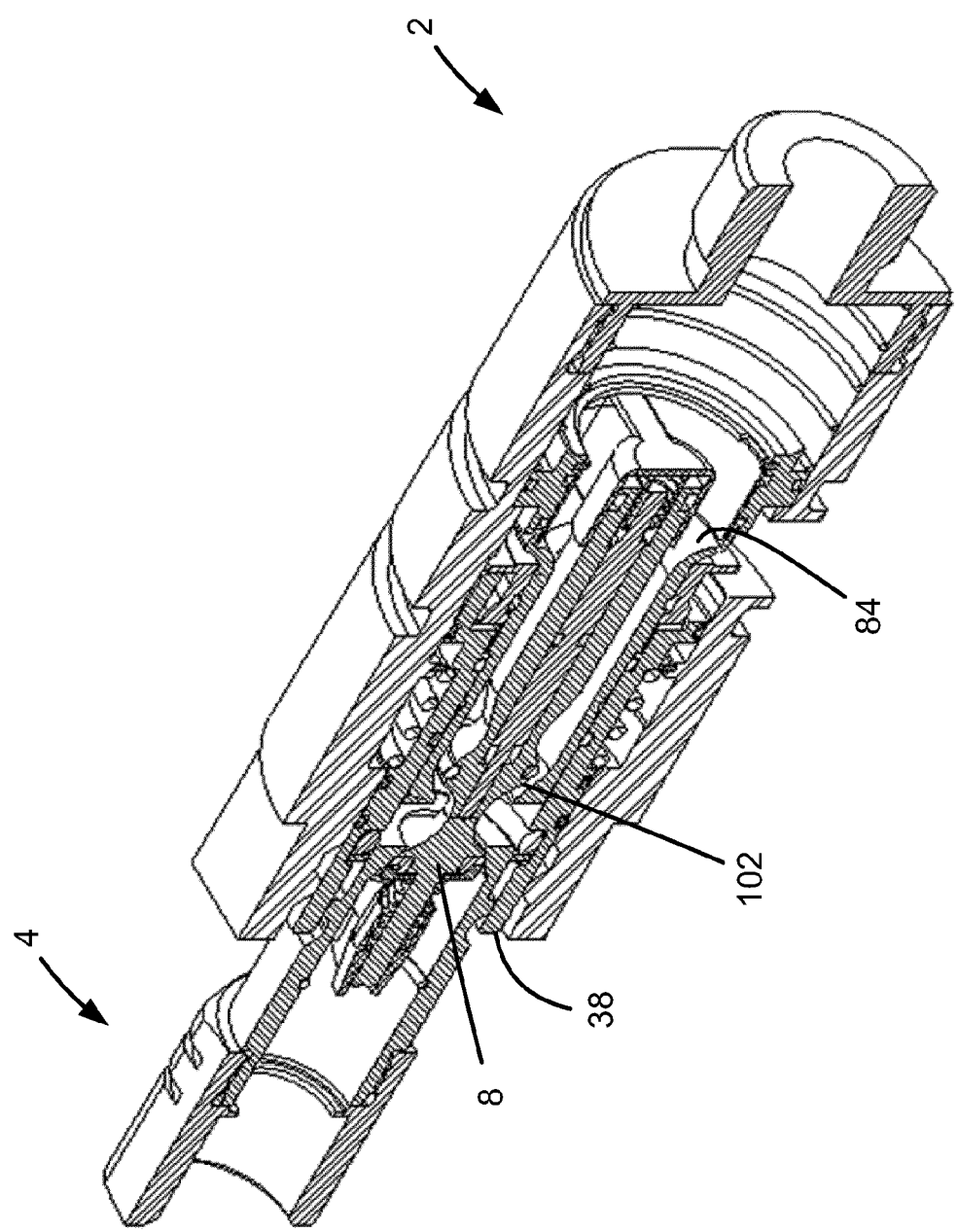
FIG. 9 is a cross-sectional isometric view of the coupling of FIG. 1 in a fourth state.

Referring to FIGS. 8 and 9, a fourth state is illustrated. In the depicted fourth state, the male coupling assembly 4 has been manually pushed further into the female coupling assembly 2. The plug 8 has driven the poppet 102 rearward into the poppet guide 100 and further compressed the pin spring 106. Since the poppet 102 has moved rearward relative to the stationary piston 84, a flow path is open allowing hydraulic fluid to flow out of the piston 84 into the cavity defined by the socket and the front of the plug 8. The pressure in this fluid may be relatively low since flow path FP1 was open in the prior state and remains open at least in part of this state.

In the depicted fourth state, the piston 84, the socket body 38, and the ball support 126 remain in the home position. In the depicted third state, flow path FP1 is open, flow path FP3 is closed, and the primary flow path is closed.

Figure 10:
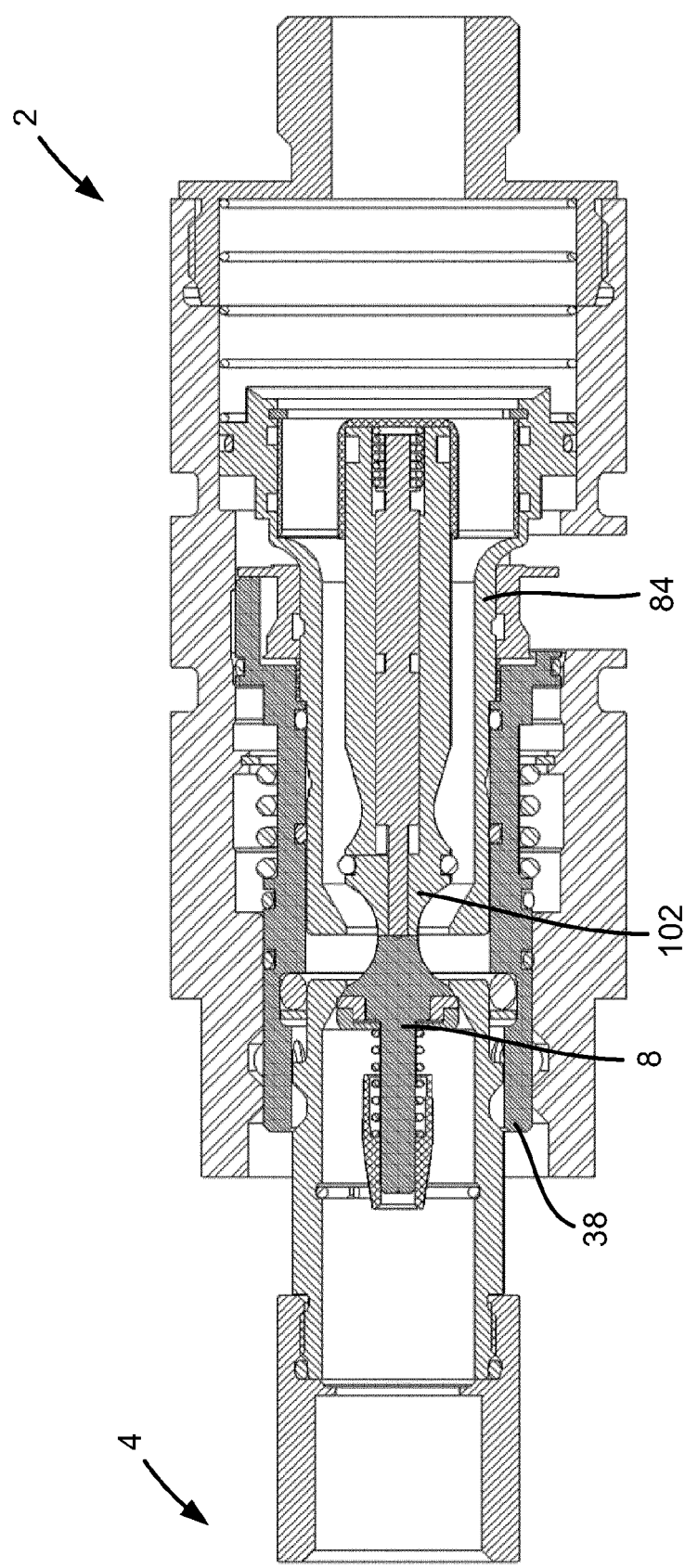
FIG. 10 is a cross-sectional plane view of the coupling of FIG. 1 in a fifth state.
Figure 11:
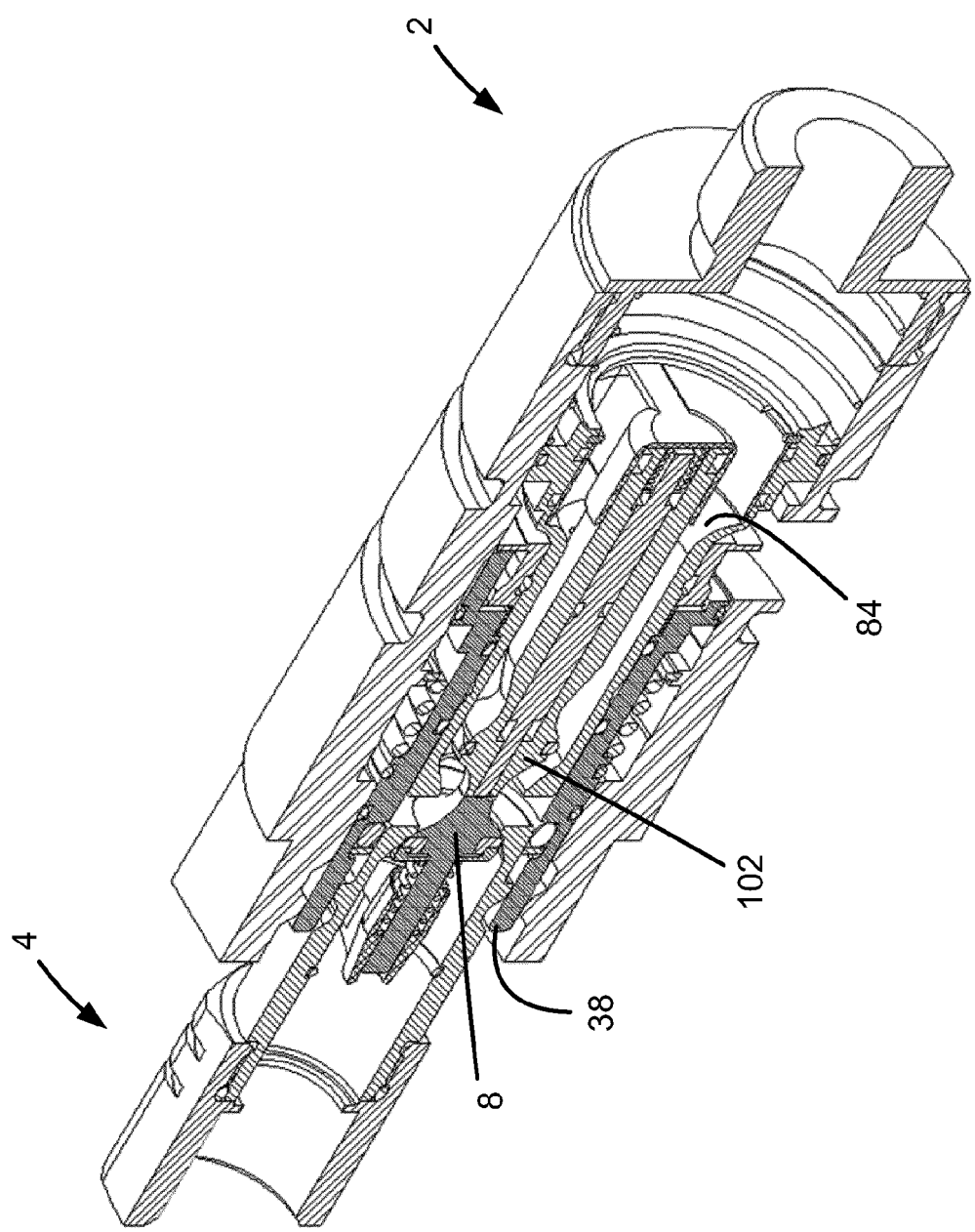
FIG. 11 is a cross-sectional isometric view of the coupling of FIG. 1 in a fifth state.

Referring to FIGS. 10 and 11, a fifth state is illustrated. In the depicted fifth state, the male coupling assembly 4 is manually pushed further into the socket body 38 rearward to activate the mechanical locking mechanism. The lip 156 on the plug body 6 that was initially engaged with the mechanical latch balls 116 in the fourth state begins to drive the balls 116 rearward, which drives the socket body 38 rearward. The mechanical latch balls 116 are then driven by the lip 156 radially outwardly into the recess in the coupling body 10. The male coupling assembly 4 is continued to be driven further into the female coupling assembly 2. As the socket body 38 moves rearward, the socket body spring 64 is compressed and pushes back against the manual force of the operator. As the male coupling assembly 4 is continued to be driven further, the poppet 102 is driven rearward until it bottoms out on the poppet guide 100 and drives the entire piston 84 rearward. The rearward movement of the piston 84 compresses the piston spring 90. The ball support 126 moves rearward with the socket body 38 due to the spring 158 located between the ball ramp and the socket.

In the depicted fifth state, flow path FP1 is closed because the o-ring 112 on the external surface of the poppet 102 blocks the flow path 140 in the poppet guide 100. Flow path FP2 is open, flow path FP3 is open, and the primary flow path is closed. Since flow paths FP2 and FP3 are open, hydraulic fluid can continue to flow out of the coupling body 10 as the plug body 6 moves into the coupling body 10 and displaces the fluid.

Figure 12:
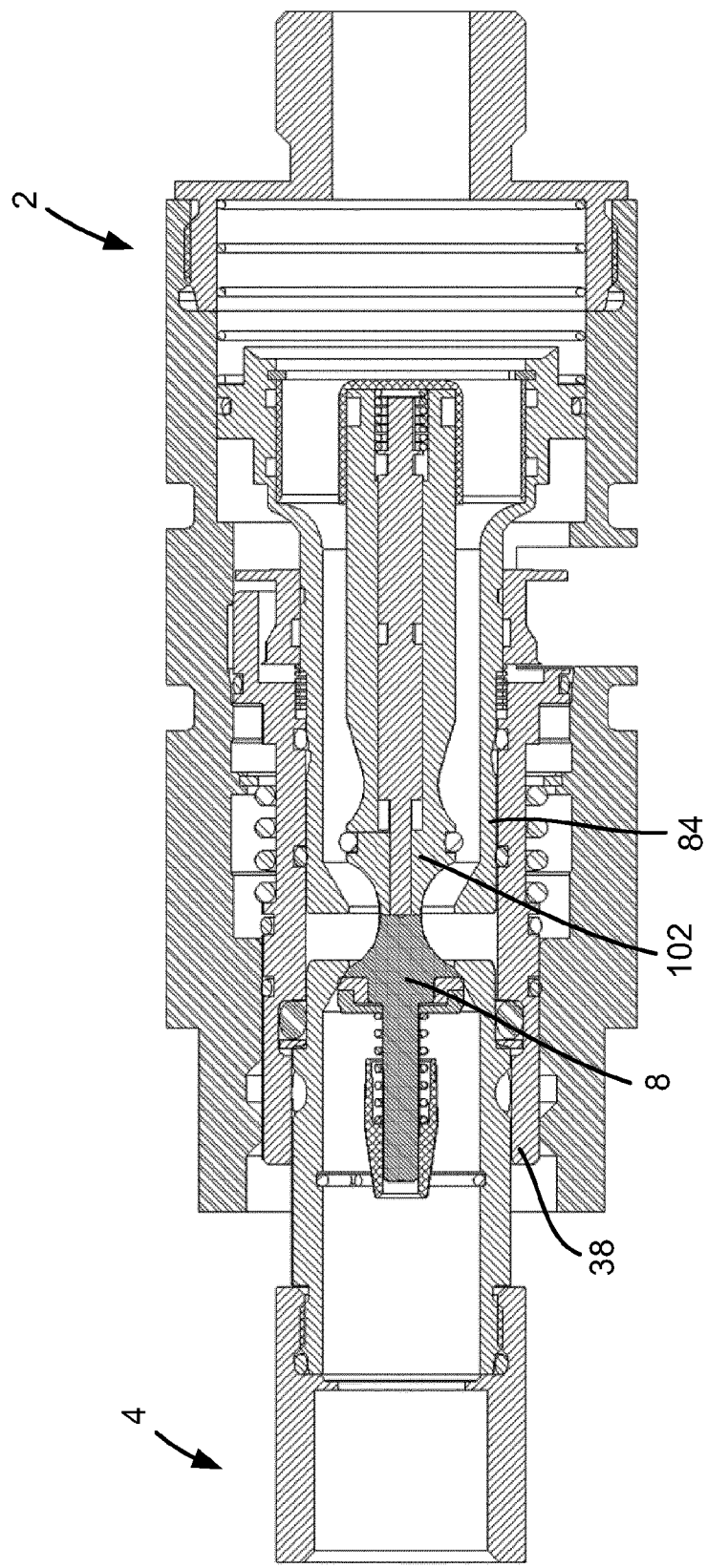
FIG. 12 is a cross-sectional plane view of the coupling of FIG. 1 in a sixth state.
Figure 13:
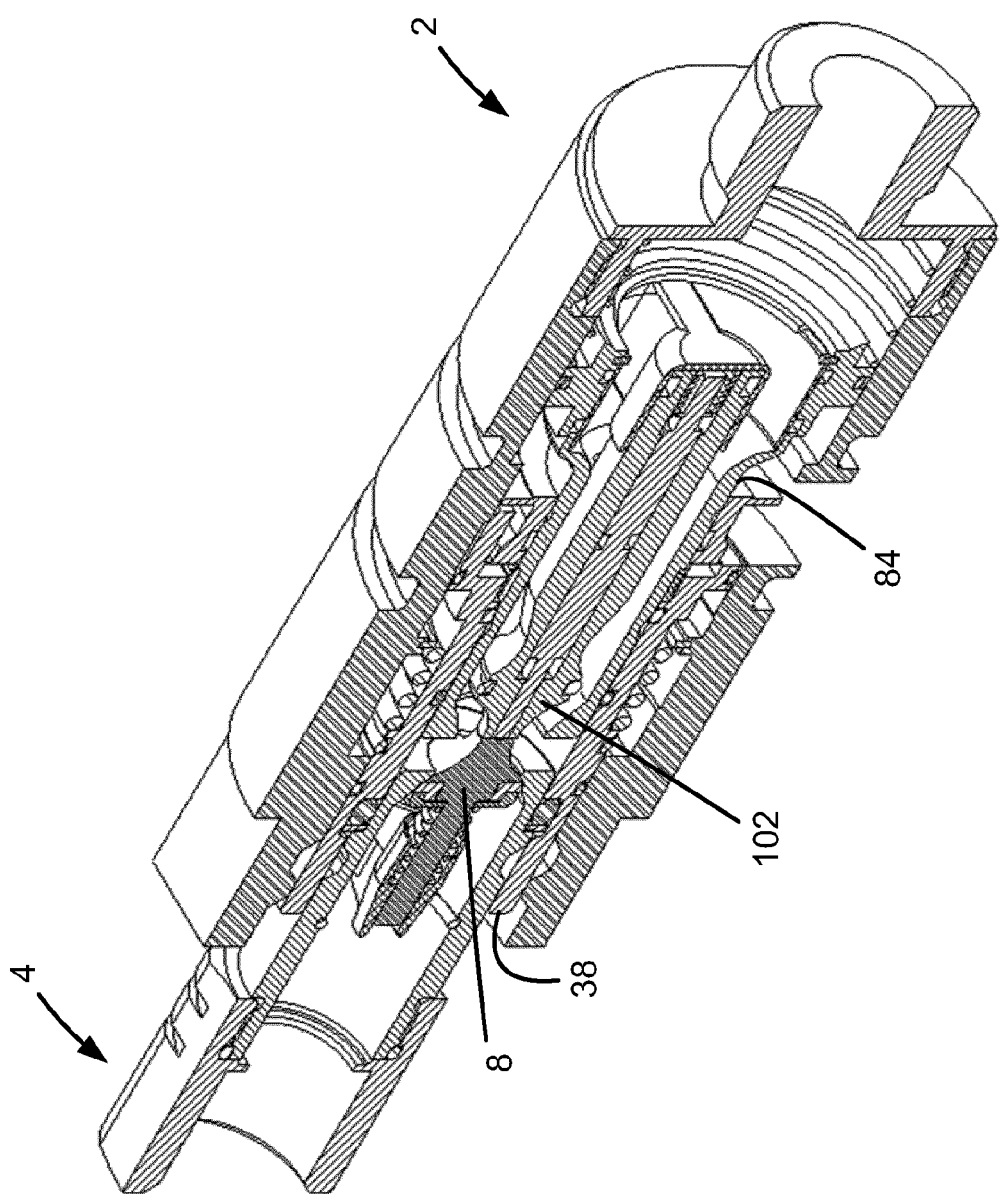
FIG. 13 is a cross-sectional isometric view of the coupling of FIG. 1 in a sixth state.

Referring to FIGS. 12 and 13, a sixth state is illustrated. In the depicted sixth state, the male coupling assembly 4 is pushed further and the mechanical locking mechanism engages. As the plug body 6 moves further into the female coupling assembly 2, it further drives the poppet 102 rearward, which had already bottomed out on the poppet guide 100. The forward movement of the plug body 6 drives the entire piston 84 further rearward and further compresses the piston spring 90. The socket body 38 is not driven rearward any further because the lip 156 has passed within the ring of balls 116, which allows the plug 8 to move without applying force to the socket body 38.

The mechanical latch balls 116 become aligned with the groove 160 located behind the lip 156. The socket body spring 64 applies force to move the socket back to the right towards its home position, which drives the latch balls 116 inwardly into the groove 160.

In the depicted sixth state, flow path FP1 is closed, flow path FP2 is open, flow path FP3 is open, and the primary flow path is closed.

Figure 14:
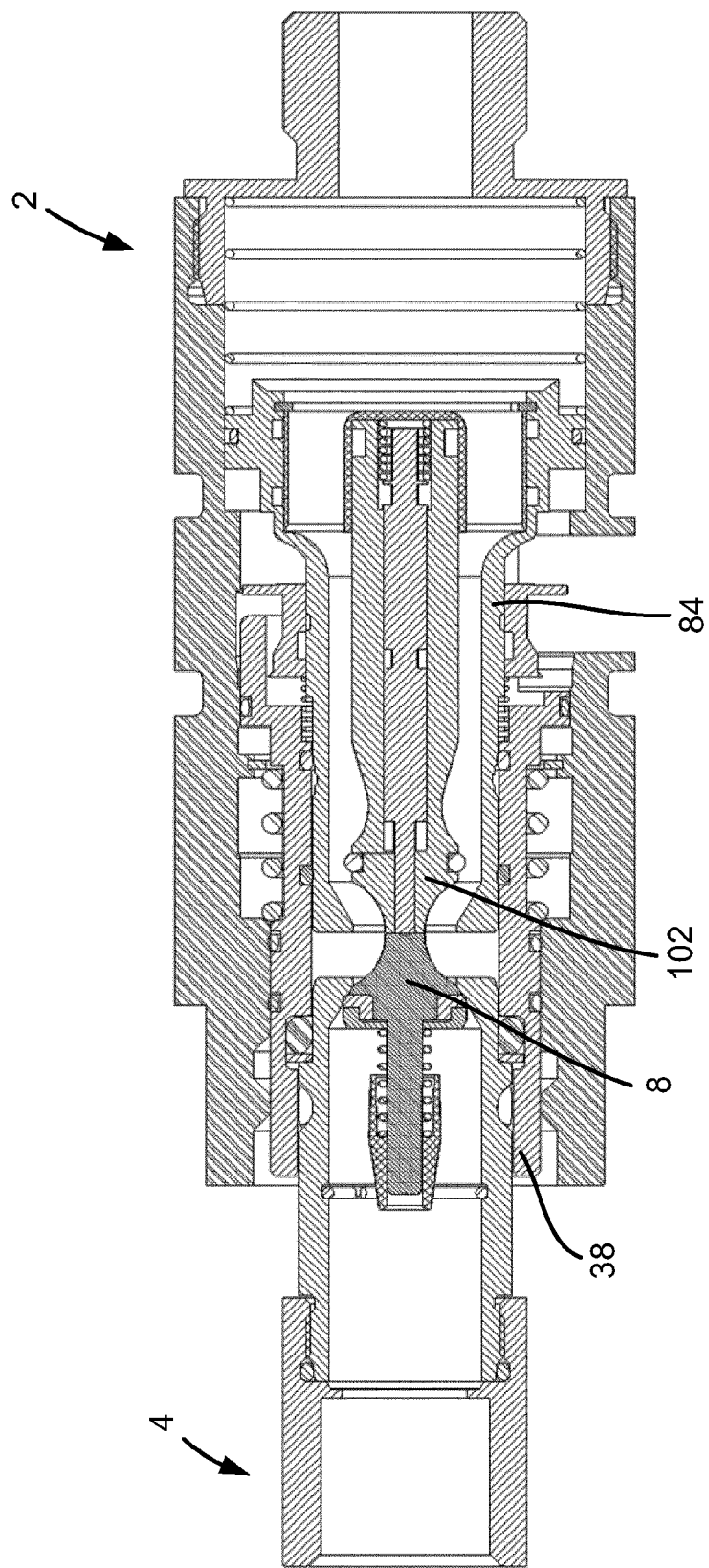
FIG. 14 is a cross-sectional plane view of the coupling of FIG. 1 in a seventh state.
Figure 15:
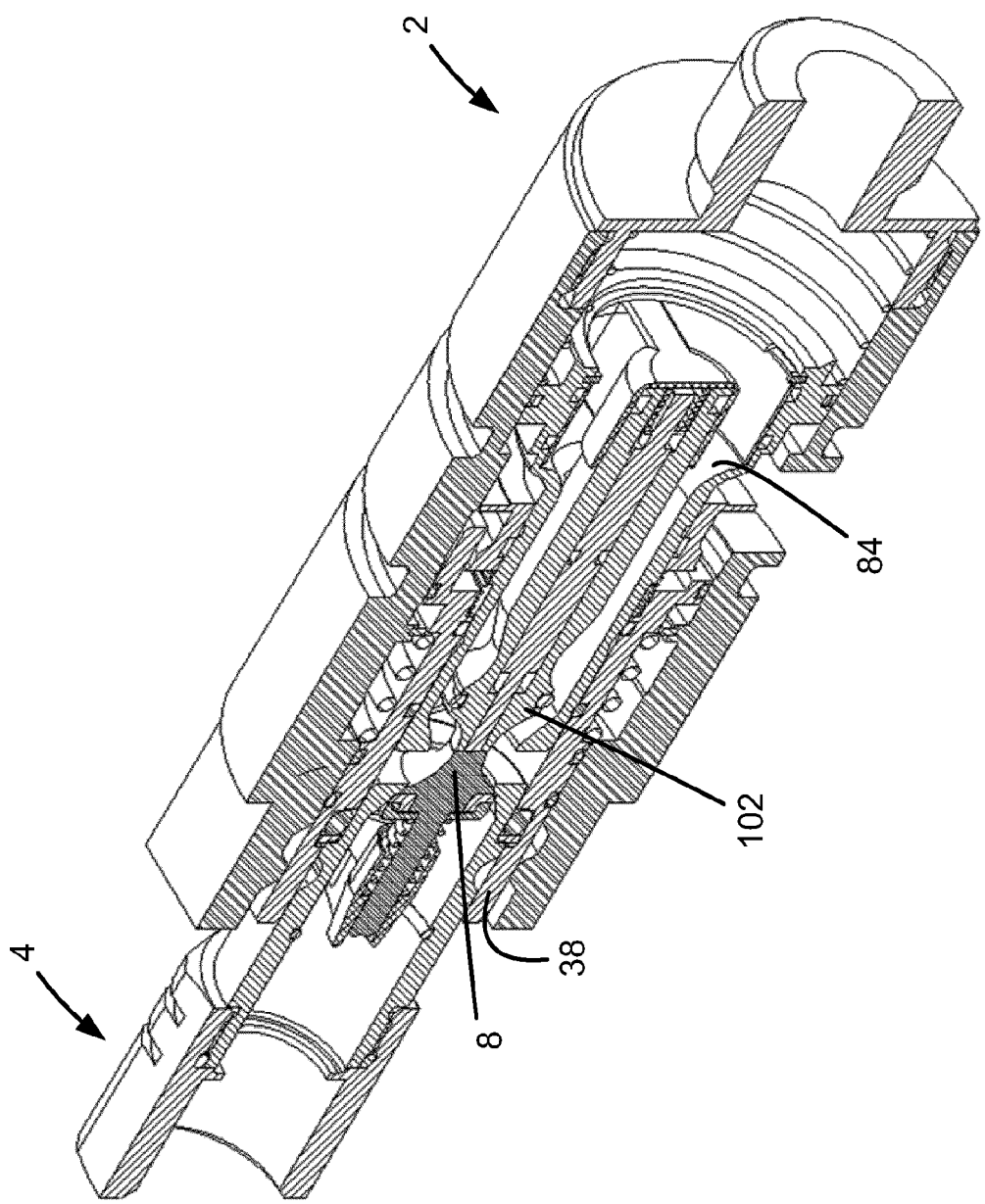
FIG. 15 is a cross-sectional isometric view of the coupling of FIG. 1 in a seventh state.

Referring to FIGS. 14 and 15, a seventh state is illustrated. In the depicted seventh state, the male coupling assembly 4 is manually released by the operator and the mechanical locking mechanism retains the plug 8 to the socket. Absent the manual push force applied by the operator, the socket body spring 64 drives the socket back to the home position. The forward locking mechanism is engaged as the ball 130 rides up the ball support 126 and engages the tapered inner surface of the coupling body 10. The piston spring 106 continues to apply a force on the poppet 102 via the poppet guide 100 and the plug 8 applies an equal force. This force is insufficient to open the plug 8 of the male coupling assembly 4.

In the depicted seventh state, flow path FP1 is closed, flow path FP2 is open, flow path FP3 is closed, and the primary flow path is closed. The pump/motor remains shut off, therefore the pressure inside the male coupling assembly 4 is low. The male coupling assembly 4 is not mechanically latched to the female coupling assembly 2.

Figure 16:
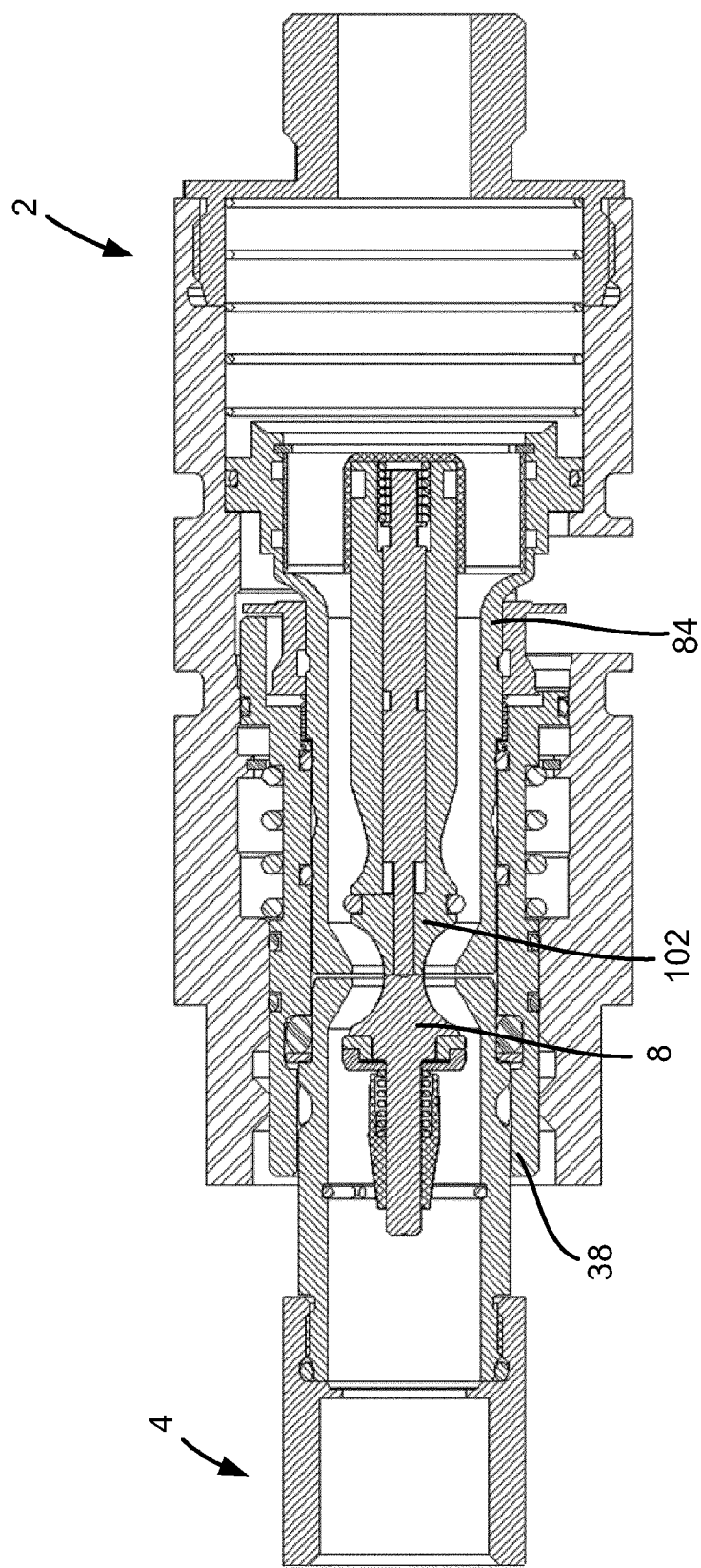
FIG. 16 is a cross-sectional plane view of the coupling of FIG. 1 in an eighth state.
Figure 17:
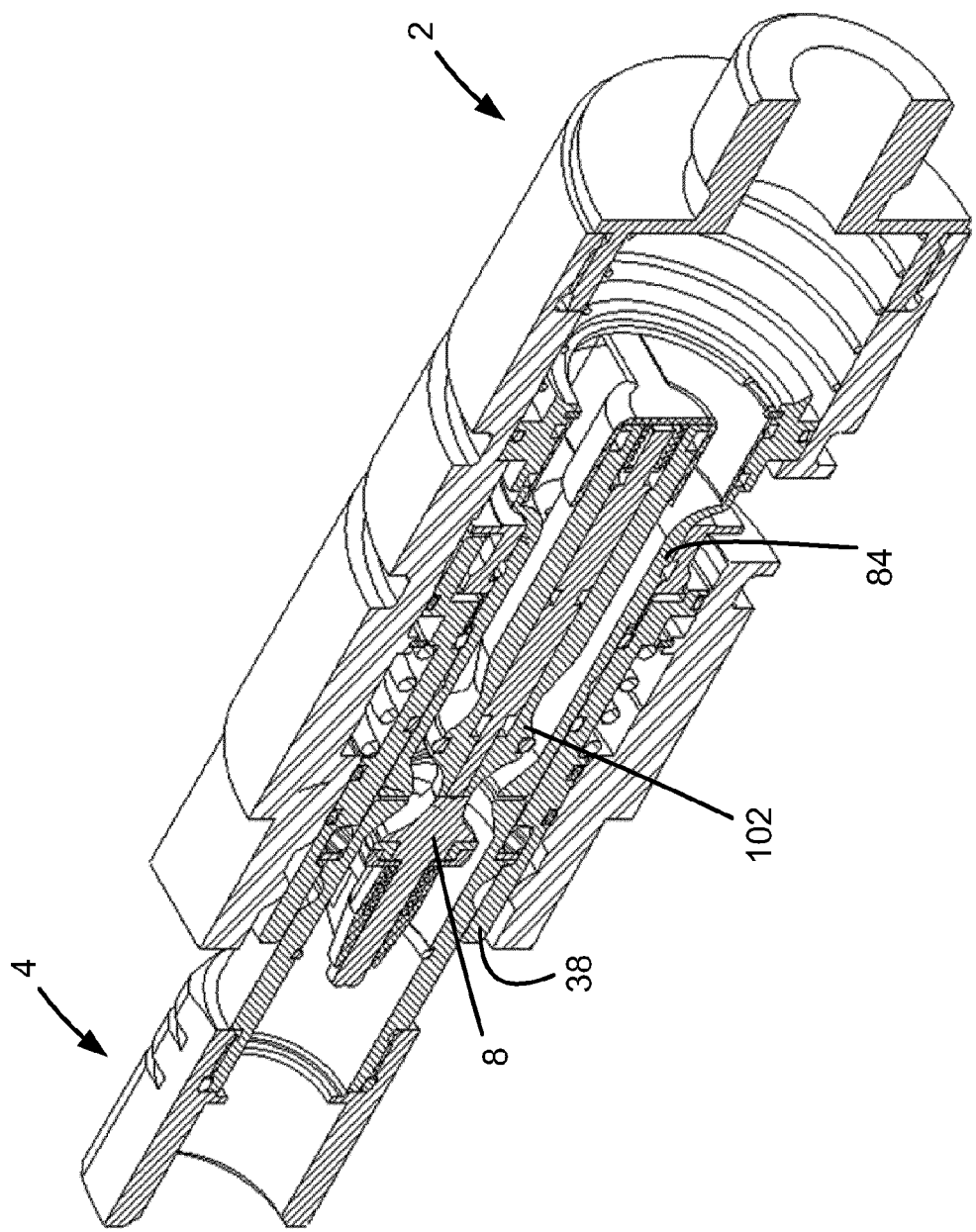
FIG. 17 is a cross-sectional isometric view of the coupling of FIG. 1 in an eighth state.

Referring to FIGS. 16 and 17, an eighth state is illustrated. In the depicted eighth state, the primary flow path is opened between the male coupling assembly 4 and the female coupling assembly 2. In the eighth state, the pump/motor is no longer shut off. Either the pump/motor is turned on or the flow from the pump/motor that is already on is opened. This action pressurizes the coupling.

In the depicted embodiment, the projected area of the back area of the piston 84 is at least two times the area of the projected area of the front face of the plug 8 of the male coupling assembly 4. In the depicted embodiment, the area of the rear projection of the piston 84 is six times the area of the projected area of the plug 8. This means that very small pressure in the female coupling assembly 2 is sufficient to open the plug 8. For example, 60-70 bars in the coupling is enough to open the plug 8, which may be under 400 bars of back pressure. Many other ratios are possible.

When the coupler body cavity is pressurized, a proportionally greater force is generated on the piston 84 than on the plug 8 of the male coupling assembly 4. As a result, the poppet 102, which was bottomed out on the piston 84 pushes the plug 8 in the second direction SD. The plug body 8 cannot move in the second direction SD since it is mechanically locked to the socket body 38, which is held by the forward locking assembly 114. The plug 8 of the male coupling assembly 4 moves in the second direction SD relative to the plug body 6, and the plug 8 opens the primary flow path and allows fluid from the male coupling assembly 4 to flow into the female coupling assembly 2.

In the depicted eighth state, flow path FP1 is closed, flow path FP2 is closed, flow path FP3 is closed, and the primary flow path is open. In the depicted embodiment, when the primary flow path is fully open, the flow rate can be at or above 140 l/min from the female coupling assembly 2 to the male coupling assembly 4 with a pressure drop of less than 10 bars, and the flow rate can be at or above 220 l/min from the male coupling assembly 4 to the female coupling assembly 2 with a pressure drop of less than or equal to 8 bars.

Figure 18:
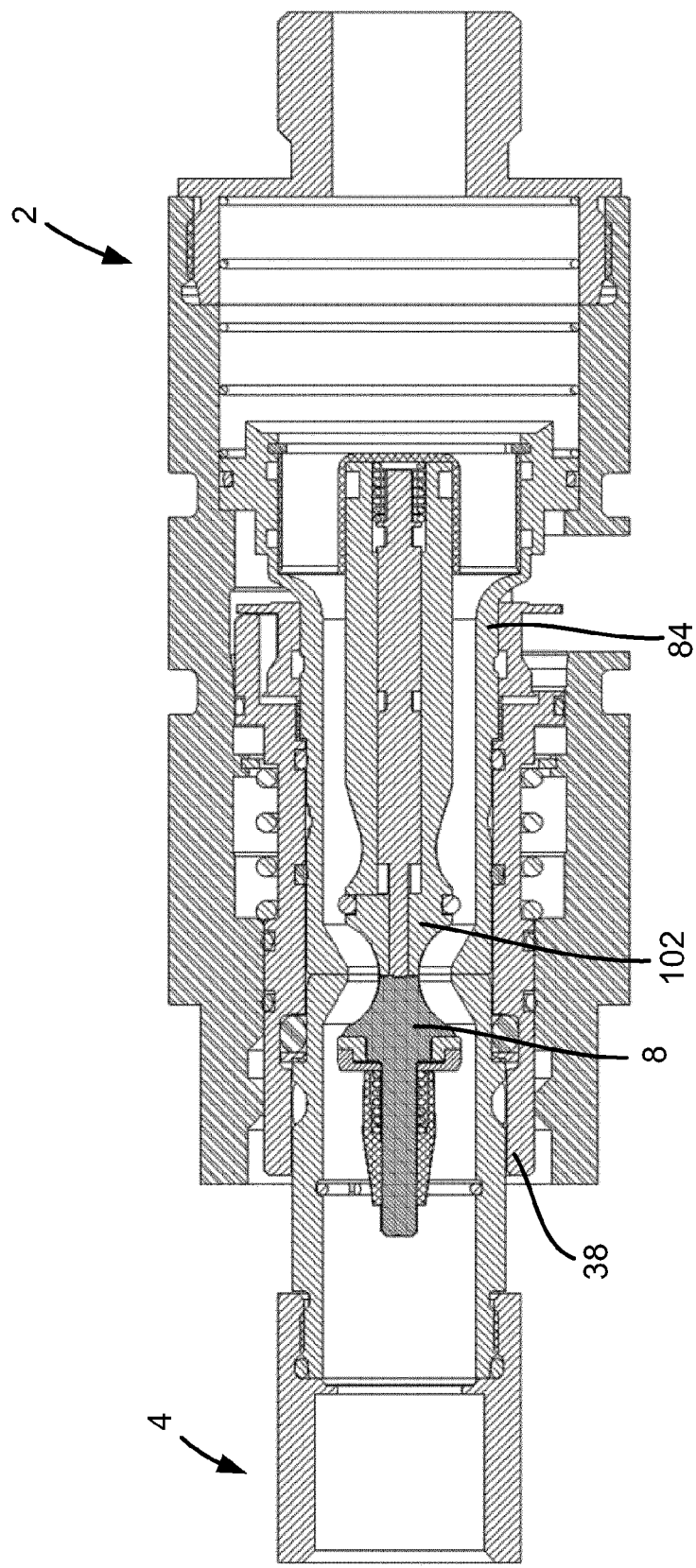
FIG. 18 is a cross-sectional plane view of the coupling of FIG. 1 in a ninth state.
Figure 19:
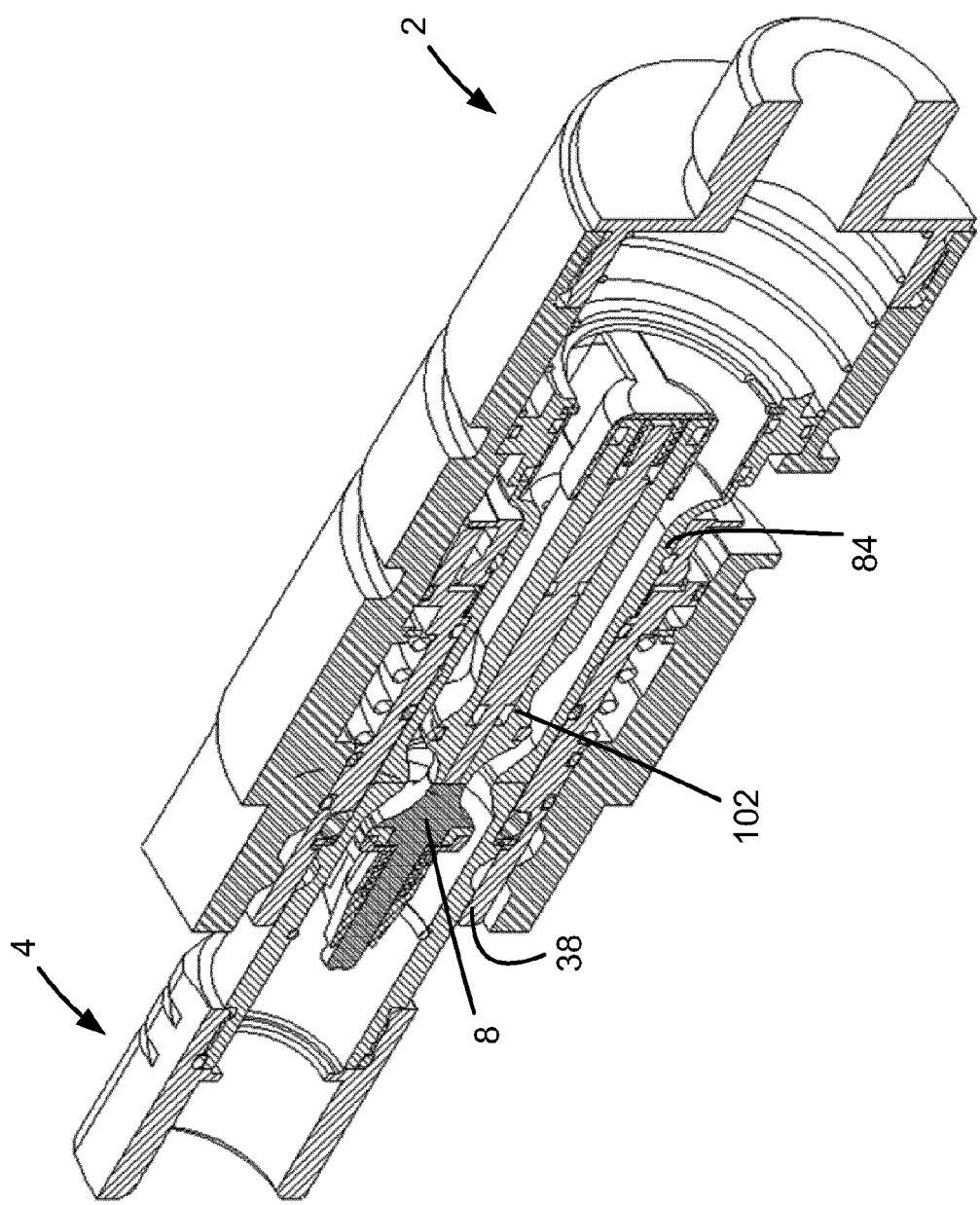
FIG. 19 is a cross-sectional isometric view of the coupling of FIG. 1 in a ninth state.

Referring to FIGS. 18 and 19, the ninth state is substantially similar to the eighth state. What is illustrated in the ninth state is that when the piston 84 further moves in the second direction SD it forces the ball support 126 to also move in the second direction SD. This causes the ball 116 to move radially inward and disengages the forward locking mechanism. In the state where the primary flow path is completely open, the forward locking mechanism is disengaged.

Figure 20:
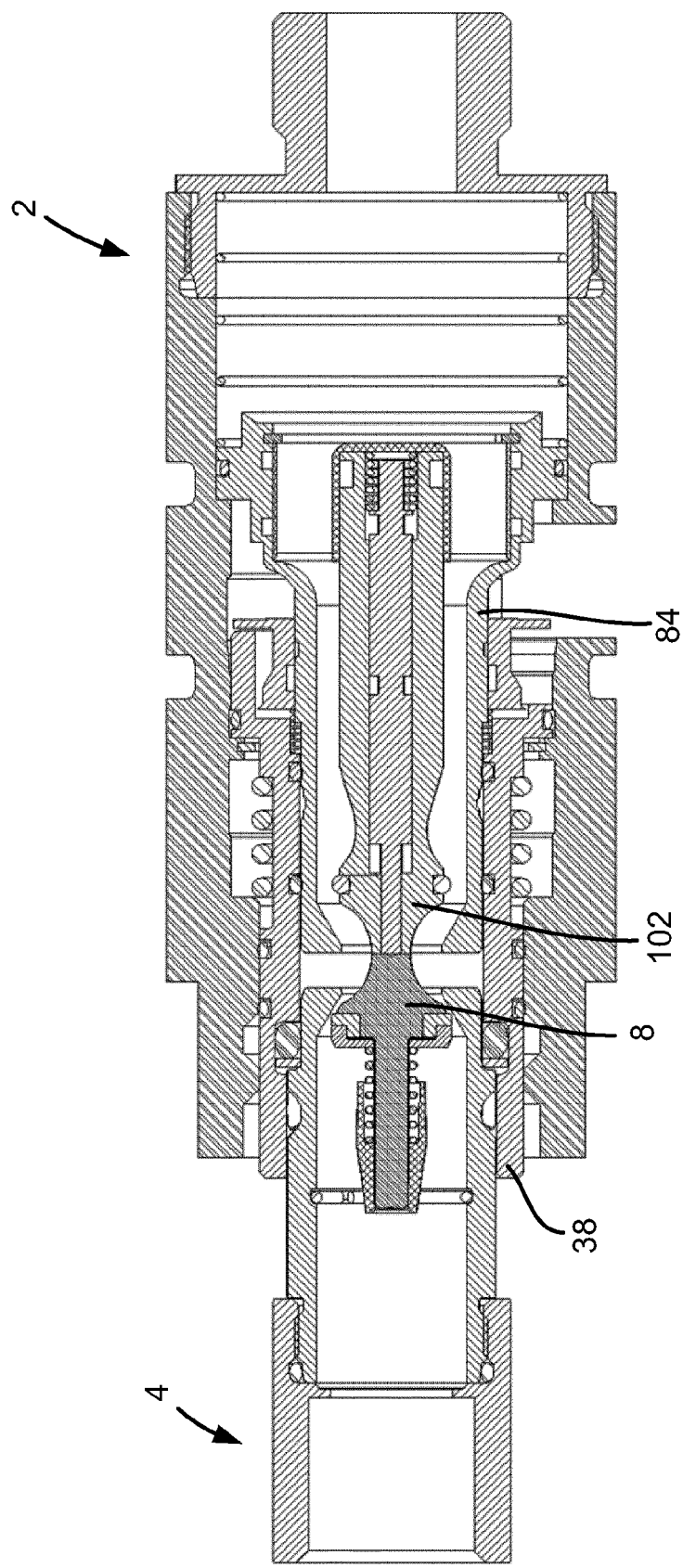
FIG. 20 is a cross-sectional plane view of the coupling of FIG. 1 in a tenth state.
Figure 21:
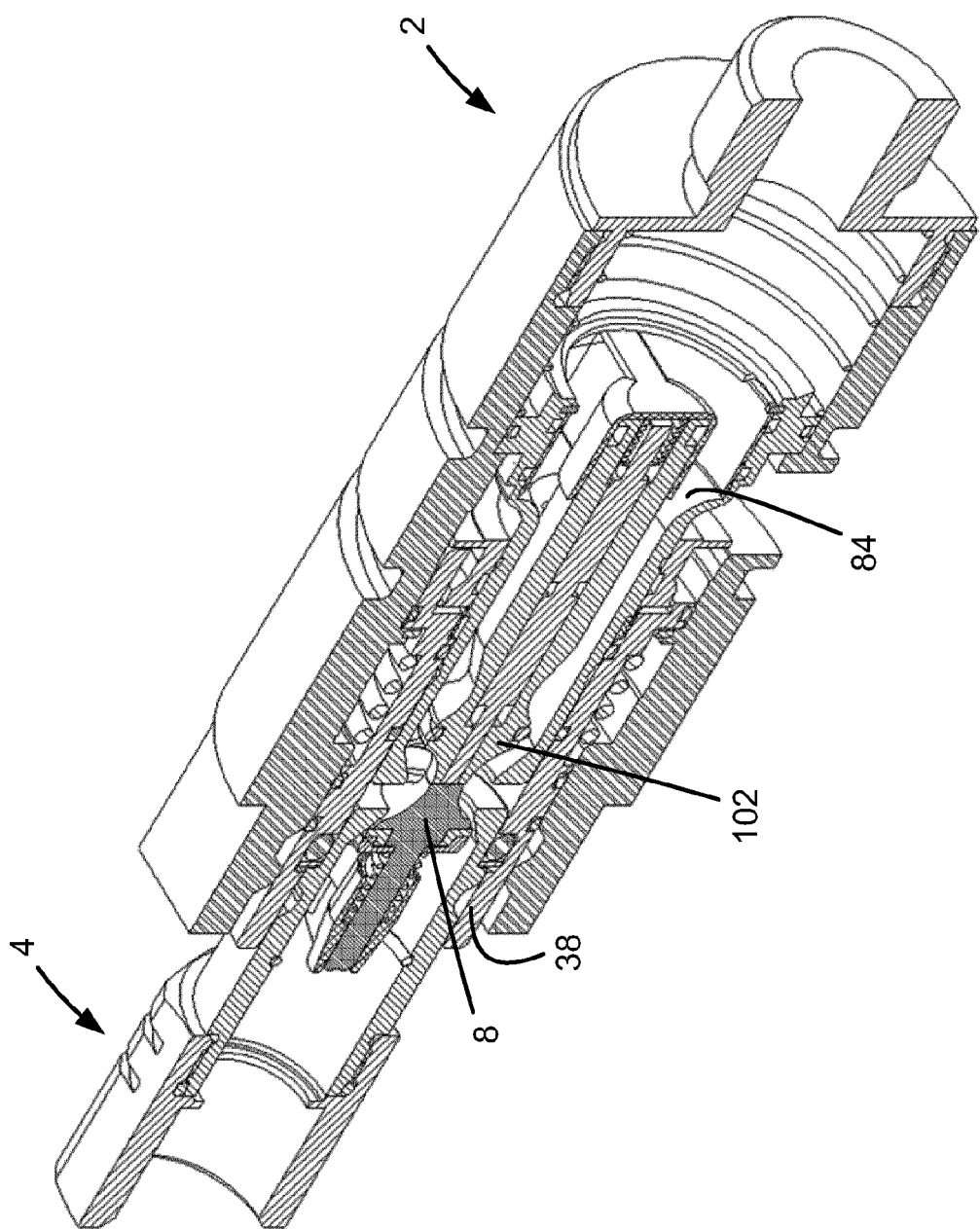
FIG. 21 is a cross-sectional isometric view of the coupling of FIG. 1 in a tenth state.

Referring to FIGS. 20 and 21, a tenth state is illustrated. In the depicted tenth state, the male coupling assembly 4 is being physically pulled from the female coupling assembly 2 to initiate a disconnection sequence. This illustrated tenth state is representative of the internal coupling in all of the below described disconnection scenarios: (scenario 1) operator turns off pump, manually decompresses the coupling (e.g., activates a lever), then pulls the plug; (scenario 2) operator turns off the pump, the coupling is still pressurized (e.g., 210 bars), the plug is pulled forcefully (e.g., 200+ Newtons) to detach it from the coupling; or (scenario 3) the plug is pulled from the coupling inadvertently while the pump is still running (e.g., the attachment is physically disconnected but the hydraulic lines are still connected and the operator accidently drives away from the attachment).

In the depicted tenth state, external force is applied to the male coupling assembly 4 to get it out of the female coupling assembly 2. Since the plug body 6 is mechanically locked to the socket body 38, pulling the plug 8 in a second direction SD pulls the socket body 38 and compresses the socket body spring 64 (also referred to as a breakaway spring).

In an embodiment that includes a manual pressure relief step, the lever or other mechanism can be actuated to push the ball support 126 forward. This manual action opens flow path FP3. The coupling body 10 has a larger diameter portion that allows for leakage past the o-ring 54 when the socket is moved axially. This allows the pressure in the pressure cavity to be relieved, which makes it easier to move the socket in the second direction SD. This manual pressure relief step results in less force needed to accomplish the disconnection. In scenarios 2 and 3, which do not involve pressure release, the external force that needs to be applied to the male coupling assembly 4 in order to accomplish the disconnection is relatively higher. The retained pressure in the coupling is balanced and does not facilitate the disconnection.

Figure 22:
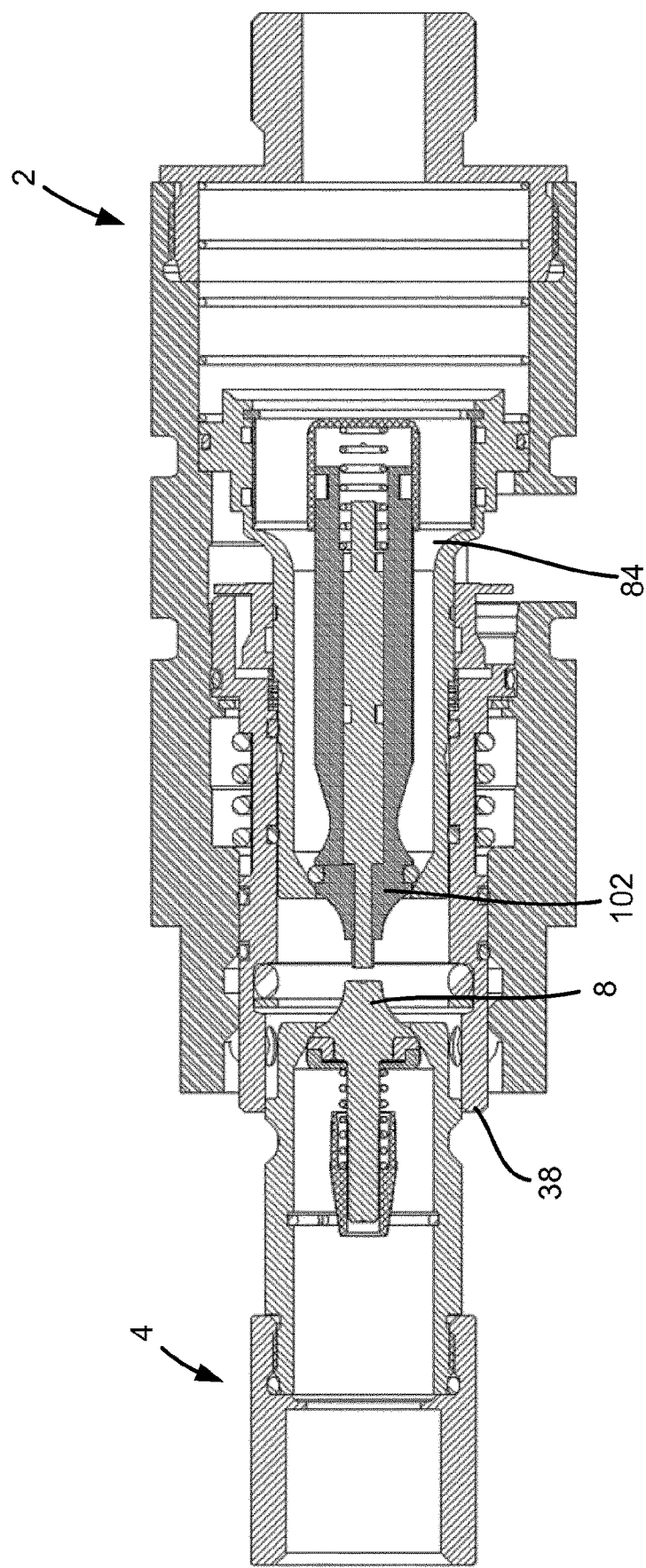
FIG. 22 is a cross-sectional plane view of the coupling of FIG. 1 in an eleventh state.
Figure 23:
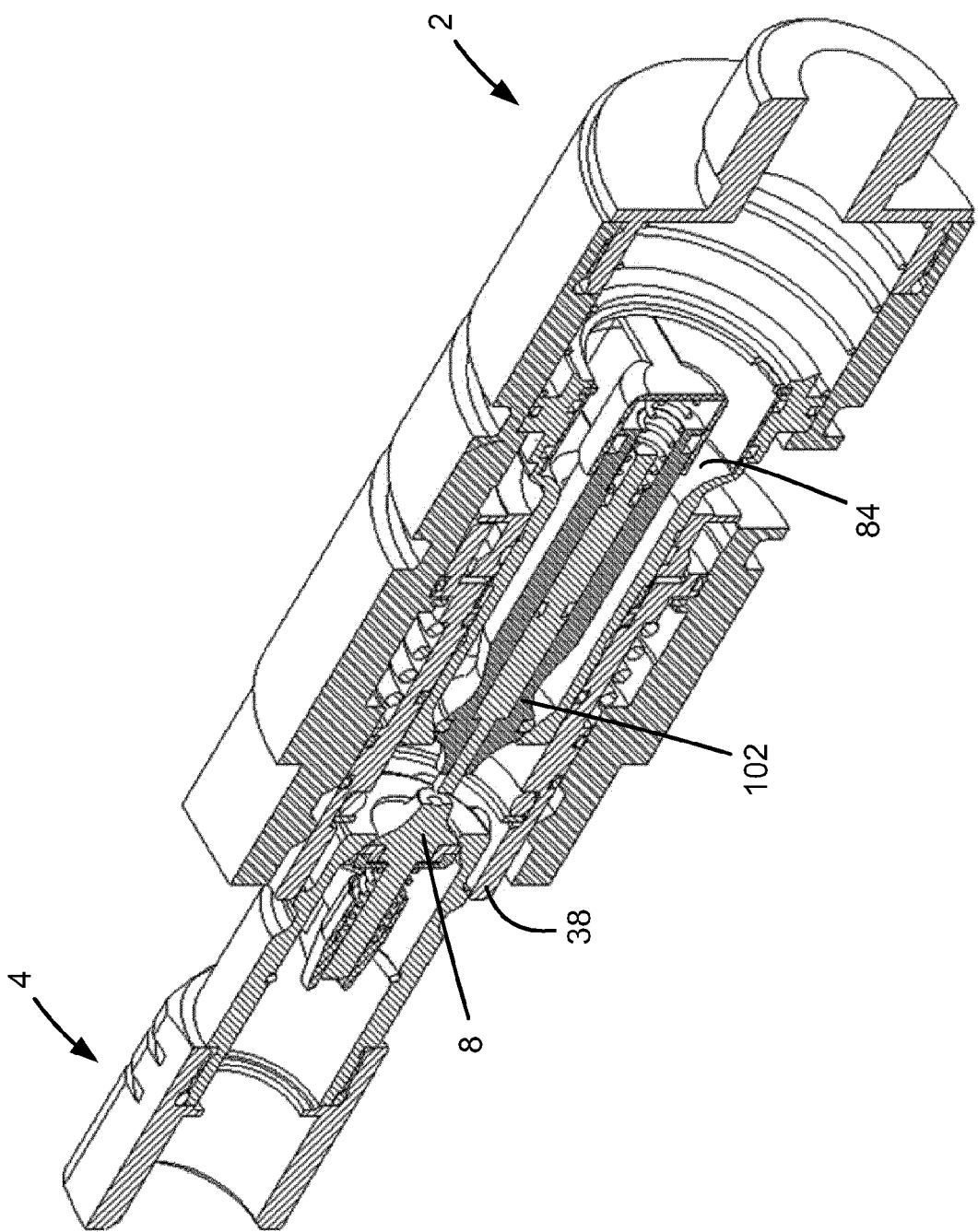
FIG. 23 is a cross-sectional isometric view of the coupling of FIG. 1 in an eleventh state.

Referring to FIGS. 22 and 23, an eleventh state is illustrated. In the depicted eleventh state, the male coupling assembly 4 has been pulled free of the female coupling assembly 2. A manual pulling force is continually applied to the male coupling assembly 4. The mechanical ball locking mechanism disengages. The poppet pin 104 moves forward due to the poppet spring force. The poppet 102 moves forward relative to the piston 84 due to the residual hydraulic pressure on its rear face as well as the force from the piston spring 90. The plug 8 of the male coupling assembly 4 seals due to its spring force and any residual pressure in the male coupling assembly 4, which drives the plug 8 in the first direction FD.

Figure 24:
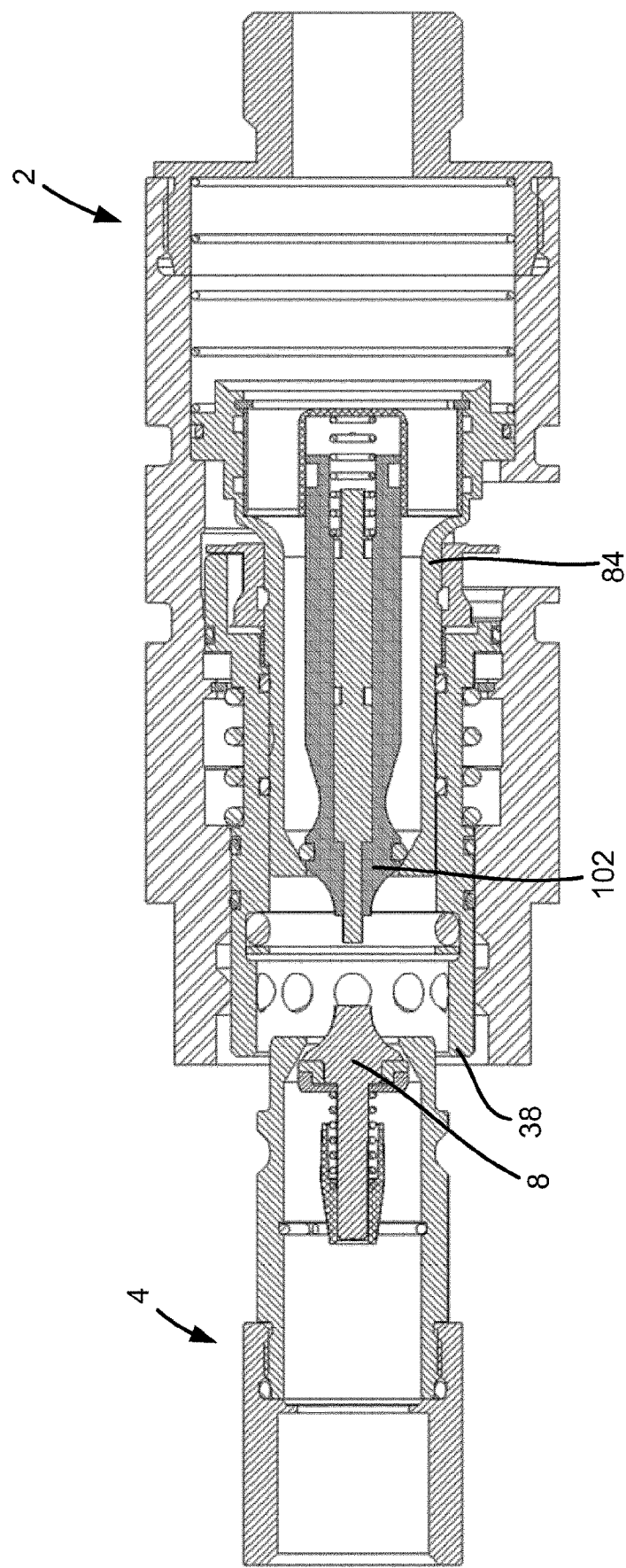
FIG. 24 is a cross-sectional plane view of the coupling of FIG. 1 in a twelfth state.
Figure 25:
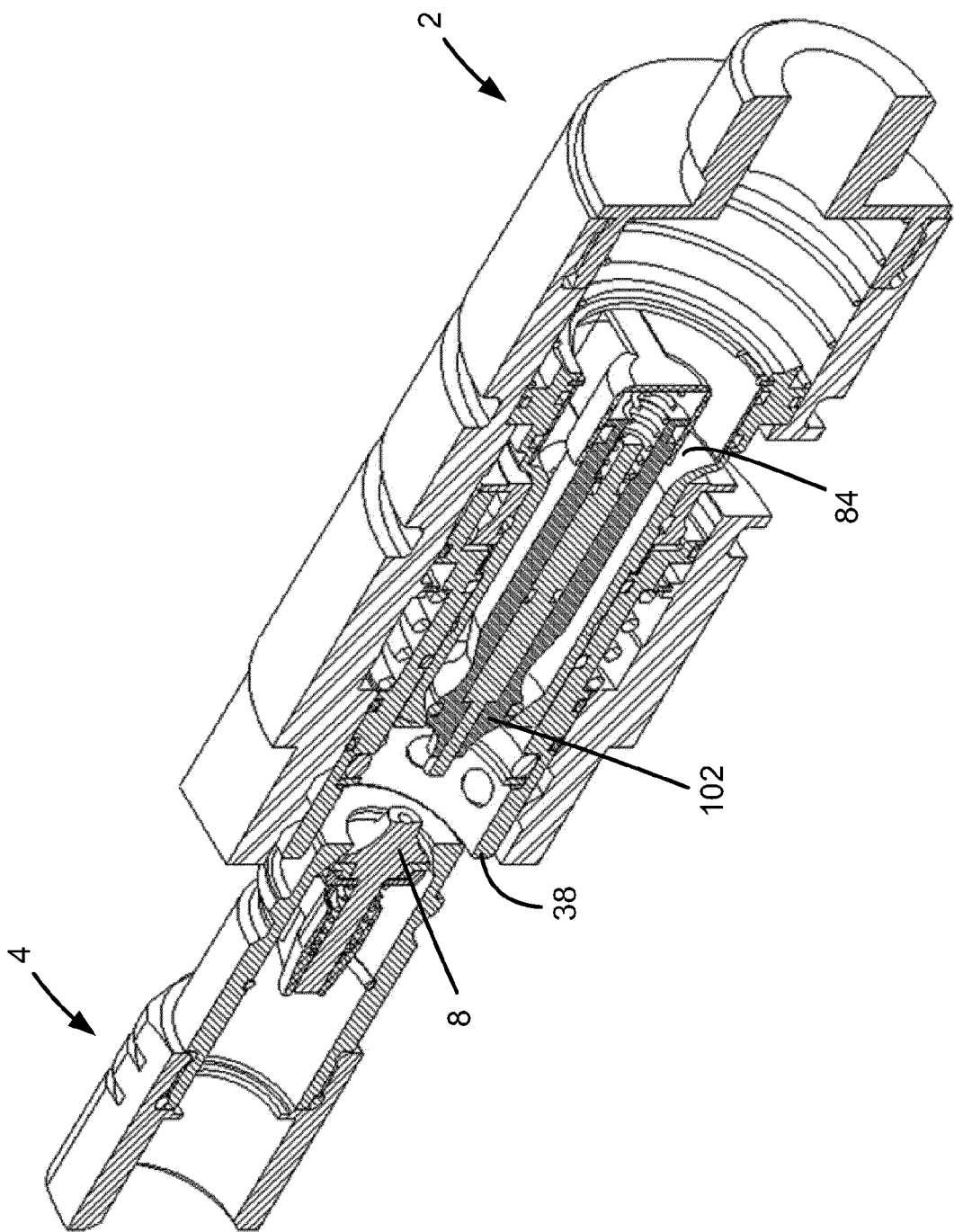
FIG. 25 is a cross-sectional isometric view of the coupling of FIG. 1 in a twelfth state.

Referring to FIGS. 24 and 25, a twelfth state is illustrated. In the depicted twelfth state, the internal components of the female coupling assembly 2 automatically return to its home positions. Flow path FP1 is open, flow path FP2 is closed, flow path FP3 is closed, and the primary flow path is closed.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A coupling comprising:
   a coupling body defining a generally cylindrical inner cavity including a first end portion and a second end portion;
   a socket body including a first end portion and a second end portion, the first end portion of the socket body coaxially positioned within the first end portion of the coupling body, the socket body configured to slide axially relative to the coupling body;
   a piston including a first end portion and a second end portion, the first end portion of the piston being coaxially positioned within the socket body, the piston configured to slide axially relative to the socket body as well as the coupling body;
   a poppet including a first end portion and a second end portion, the first end portion of the poppet coaxially positioned within and abutting the first end portion of the piston, the poppet configured to slide axially relative to the piston; and
   a poppet pin including a first end portion and a second end portion, the poppet pin coaxially positioned within the poppet, the poppet pin configured to slide axially relative to the poppet.

2. The coupling of claim 1, wherein the socket body includes an annular shoulder having a projected area that is substantially equal to the cross-sectional area of the inside of the socket body.

3. The coupling of claim 2, wherein a piston coupling body o-ring is positioned between the second end of the piston and the coupling body, a piston coupling body cavity is defined between the piston, the coupling body, the second socket body coupling body o-ring, and the piston coupling body o-ring.

4. The coupling of claim 1, wherein the second end of the piston has a projected area that is at least twice a projected area of the first end of the poppet.

5. The coupling of claim 1, wherein a first socket body coupling body o-ring is positioned between the first end of the socket body and the coupling body, a second socket body coupling body o-ring is positioned between the second end of the socket body and the coupling body, a socket cavity is defined between the socket body, the coupling body, the first socket body coupling body o-ring, and the second socket body coupling body o-ring.

6. The coupling of claim 1, wherein a double acting socket body spring is positioned between the socket body and the coupling body configured to bias the socket body axially in a home position within the coupling body.

7. The coupling of claim 1, further comprising a piston spring that contacts the second end of the piston and biases towards the first end of the coupling body.

8. The coupling of claim 1, further comprising a forward locking mechanism that includes a ball support ramp and a ball that is positioned between the ball support ramp, the socket body, and the coupling body.

9. A method of connecting a male coupling to a female coupling including the steps of:
   pushing a male coupling into a female coupling and driving a piston and poppet assembly in the female coupling rearward to cause a locking mechanism to lock the male coupling to the female coupling; and
   energizing a pump to drive hydraulic fluid into the female coupling and drive the piston forwardly, which drives a poppet of the male coupling rearward to open a primary flow path that extends form the female coupling to the male coupling,
   wherein energizing a pump to drive hydraulic fluid into the female coupling and drive the piston forwardly, drives a ball support member forwardly, and releases a forward locking mechanism and readies the coupling for breakaway.

10. A coupling comprising:
   a coupling body defining a generally cylindrical inner cavity including a first end portion and a second end portion;
   a socket body including a first end portion and a second end portion, the first end portion of the socket body coaxially positioned within the first end portion of the coupling body, the socket body configured to slide axially relative to the coupling body;
   a piston including a first end portion and a second end portion, the first end portion of the piston being coaxially positioned within the socket body, the piston configured to slide axially relative to the socket body as well as the coupling body;
   a poppet including a first end portion and a second end portion, the first end portion of the poppet coaxially positioned within and abutting the first end portion of the piston, the poppet configured to slide axially relative to the piston; and
   a poppet pin including a first end portion and a second end portion, the poppet pin coaxially positioned within the poppet, the poppet pin configured to slide axially relative to the poppet.

11. The coupling of claim 10, further comprising a first internal flow path that allows fluid to flow from a coupling body cavity into a piston cavity through a flow path in the poppet into an annular space between the poppet and the poppet pin and from the annular space between the poppet and the poppet pin through a flow path in the poppet guide and from the flow path in the poppet guide into the annular space between the poppet guide and an inner surface of the piston and from the annular space between the poppet guide and the inner surface of the piston through a flow path through the piston wall and from the flow path in the piston wall into a ball support cavity, and from the ball support cavity out of the coupling body to an external tank reservoir.

12. The coupling of claim 11, further comprising a second internal flow path that allows fluid to flow from the coupling body cavity into the piston cavity and from the piston cavity into a flow path in the piston and from the flow path in the piston into the annular space between the piston and the ball support and from the annular space between the piston and the ball support into the ball support cavity and from the ball support cavity out of the coupling body into the external tank reservoir.

13. The coupling of claim 12, further comprising a third internal flow path that allows fluid to flow from the coupling body cavity into the piston cavity and from the piston cavity into the flow path in the piston and from the flow path in the piston into the annular space between the piston and the socket body and from the annular space between the piston and the socket body through a flow path in the socket body and from the flow path in the socket body into the socket cavity and from the socket cavity into the annular space between the socket body and the inner surface of the coupling body and from the annular space between the socket body and the inner surface of the coupling body into the ball support cavity and from the ball support cavity out of the coupling body into the external tank reservoir.

14. The coupling of claim 13, wherein the coupling is configured such that in a state of operation wherein the first internal flow path is open while the second internal flow path is closed and the third internal flow path is closed.

15. The coupling of claim 13, wherein the coupling is configured such that in a state of operation wherein the first internal flow path is closed while the second internal flow path is open and the third internal flow path is open.

16. The coupling of claim 13, wherein the coupling is configured such that in a state of operation wherein the first internal flow path is closed while the second internal flow path is open and the third internal flow path is closed.

* * * * *